(12) United States Patent
Dean

(10) Patent No.: US 8,909,696 B1
(45) Date of Patent: *Dec. 9, 2014

(54) REDUNDANT DATA REQUESTS WITH REDUNDANT RESPONSE CANCELLATION

(75) Inventor: Jeffrey A. Dean, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/291,036

(22) Filed: Nov. 7, 2011

Related U.S. Application Data

(60) Provisional application No. 61/554,961, filed on Nov. 2, 2011.

(51) Int. Cl.
*G06F 15/16* (2006.01)
*G06F 15/173* (2006.01)

(52) U.S. Cl.
USPC .......................................... 709/203; 709/223

(58) Field of Classification Search
USPC ........................................................ 709/203
See application file for complete search history.

(56) References Cited

U.S. PATENT DOCUMENTS

| | | | |
|---|---|---|---|
| 5,774,660 A | 6/1998 | Brendel et al. | |
| 6,006,264 A | 12/1999 | Colby et al. | |
| 6,263,368 B1 | 7/2001 | Martin | |
| 6,327,622 B1 | 12/2001 | Jindal et al. | |
| 6,601,084 B1 | 7/2003 | Bhaskaran et al. | |
| 2004/0109410 A1* | 6/2004 | Chase et al. | 370/229 |
| 2011/0302245 A1* | 12/2011 | Li | 709/204 |
| 2012/0150948 A1* | 6/2012 | Ban | 709/203 |
| 2013/0066951 A1* | 3/2013 | Agranat et al. | 709/203 |

* cited by examiner

*Primary Examiner* — David Lazaro
*Assistant Examiner* — Mahran Abu Roumi
(74) *Attorney, Agent, or Firm* — Morgan, Lewis & Bockius LLP

(57) ABSTRACT

A server system having one or more processors and memory receives a request including server identifiers for one or more other server systems and processes the respective request. Upon completing processing of the respective request, the server system determines whether enough other server systems have undertaken responding to the respective request. When enough other server systems have not undertaken responding to the respective request, the server system sends the response to the client system from which the request was received, and sends a message to one or more of the other server systems indicating that the server system has undertaken responding to the respective request. When enough other server systems have undertaken responding to the respective request the server system foregoes sending a result of the processing to the client system from which the request was received.

29 Claims, 16 Drawing Sheets

Task Status Table
142-A (for Server 106-A)

| Request ID 402-A | Server ID 404-A | Status 406-A |
|---|---|---|
| 1 | C | Queued |
| 2 | F | Processing |
| 7 | D | Finished |
| 11 | B | Processing |
| | C | Queued |
| | D | Queued |
| | E | Queued |
| 18 | C | Processing |
| 19 | B | Processing |
| | D | Queued |

Task Queue
140-A (for Server 106-A)

| Request ID 408-A | Server IDs 410-A | Payload 412-A |
|---|---|---|
| 19 | B, D | Task 19 |
| 2 | F, G, H | Task 2 |
| 7 | D | Task 7 |
| 11 | B, C, D, E | Task 11 |
| 18 | C | Task 18 |

Task Status Table
142-B (for Server 106-B)

| Request ID 402-B | Server ID 404-B | Status 406-B |
|---|---|---|
| 3 | G | Processing |
| 4 | C | Queued |
| 11 | A | Queued |
| | C | Queued |
| | D | Queued |
| | E | Queued |
| 19 | A | Processing |
| | D | Queued |
| 29 | C | Queued |
| | D | Processing |

Task Queue
140-B (for Server 106-B)

| Request ID 408-B | Server IDs 410-B | Payload 412-B |
|---|---|---|
| 11 | A, C, D, E | Task 11 |
| 4 | C | Task 4 |
| 3 | F, G, H | Task 2 |
| 19 | A, D | Task 19 |
| 29 | C, D | Task 29 |

Figure 4

REDUNDANT DATA REQUESTS WITH REDUNDANT RESPONSE CANCELLATION

RELATED APPLICATIONS

This application claims priority to U.S. Provisional Patent Application 61/554,961, filed Nov. 2, 2011, "Redundant Data Requests with Cancellation," which is hereby incorporated by reference in its entirety.

FIELD

The present disclosure relates generally to the field of distributed client-server computer network systems, and in particular, to processing data requests in a redundant and scalable manner.

BACKGROUND

Clients frequently rely on servers to process data requests such as data processing requests and/or data retrieval requests. Receiving responses to such data processing requests in a timely and reliable manner is desirable.

SUMMARY

However, a client does not know whether or not any particular request to a server will be successful until a response to the request is received. Thus, clients can encounter substantial uncertainty as to how quickly a submitted request will be processed. In particular, if a client waits until a server has failed to process a request to perform any additional operations related to the request, a substantial delay corresponding to the time between when the request was sent to the server and when the client determined that the request had failed will be introduced into operations at the client that depend on a response to the request. Even where the server ultimately successfully processes the request, there may still be a substantial delay due to the server having a large queue of tasks or suffering from other performance issues. This delay will be experienced by a user of the client as a lag in performance of the client.

When faced with a potential lag in performance caused by the failure of a server to process a request or to timely process the request, the client may send redundant data requests to different servers, thereby reducing the likely amount of time between sending the request and receiving a response to the request. Additionally, such redundant data requests reduce the likelihood that the request will fail or that an unusually long processing time for the request at one server will cause a substantial delay at the client. However, such redundant data requests can pose a substantial burden to the servers, because when multiple servers receive the same data request, in many situations most or all of those servers will ultimately process the same data request. This results in a substantial amount of wasted computing resources because, for many data requests, performing the request a single time is sufficient and thus any additional computing resources dedicated to performing the request after the first time are wasted. As such, it would be advantageous to provide a system and method for efficiently cancelling processing of redundant data requests. In particular, an approach that enables servers to be aware of what tasks have already been processed or scheduled for processing at other server systems would enable servers to avoid performing tasks corresponding to unnecessarily redundant data requests, thereby conserving computing resources at the servers. Additionally, by reducing the server cost of redundant data requests, clients would be able to send more redundant data requests without overloading the servers, thereby increasing the reliability and speed of receiving timely responses to data requests.

In some embodiments, a method is performed at a server system having one or more processors and memory storing one or more programs for execution by the one or more processors so as to perform the method. The method includes receiving, from a client system, a respective request including server identifiers for one or more other server systems distinct from the respective server system. The method further includes, after receiving the respective request, determining whether at least a predefined number of the other server systems have a predefined task-processing status for the respective request and in accordance with a determination, prior to processing the respective request, that at least the predefined number of the other server systems have the predefined task-processing status for the respective request, performing a corresponding task-scheduling action that overrides a default task-scheduling policy as applied to the respective request. The method also includes, in accordance with a determination to perform a respective task-processing operation for the respective request at the respective server system, sending a processing-status message to one or more of the other server systems indicating that the respective server system has undertaken performance of the respective task-processing operation for the respective request and performing the respective task-processing operation.

In some embodiments, a method is performed at a server system having one or more processors and memory storing one or more programs for execution by the one or more processors so as to perform the method. The method includes receiving, from a client system, a respective request including server identifiers for one or more other server systems distinct from the respective server system and processing the respective request. Processing the request includes generating a response to the request. The method further includes, upon completing processing of the respective request, determining whether a predefined number of the other server systems have undertaken responding to the respective request. The method also includes, in accordance with a determination that less than the predefined number of the other server systems have undertaken responding to the respective request, sending the response to the client system, and sending a message to one or more of the other server systems indicating that the respective server system has undertaken responding to the respective request. The method further includes, in accordance with a determination that at least the predefined number of the other server systems have undertaken responding to the respective request forgoing sending a result of the processing to the client system.

In some embodiments, a method is performed at a client system having one or more processors and memory storing one or more programs for execution by the one or more processors so as to perform the method. The method includes sending a respective request to a first server system, the request including a request identifier, a plurality of server system identifiers for other server systems to which the client may send the respective request and a first request payload. The method further includes, after a predefined time period has elapsed without receiving a response to the respective request from the first server system sending one or more additional requests to one or more of the other server systems, a respective additional request sent to a respective other server including the request identifier, a server system identifier for the first server and a respective request payload. In some implementations, each of the one or more additional requests to one or more of the other server systems further includes a respective plurality of server system identifiers for other server systems to which the client has sent or may send the respective request.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of the methods described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 4 includes block diagrams illustrating task status tables and task queues for a plurality of tasks at a plurality of servers, in accordance with some embodiments.

DESCRIPTION OF EMBODIMENTS

Although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. Additionally, the term "and/or" as used herein refers to and encompasses any and all possible combinations of one or more of the associated listed items. Furthermore, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which can inter-operate in a distributed client-server system and corresponding methods of processing redundant data requests in an efficient and scalable manner.

Figure 1:
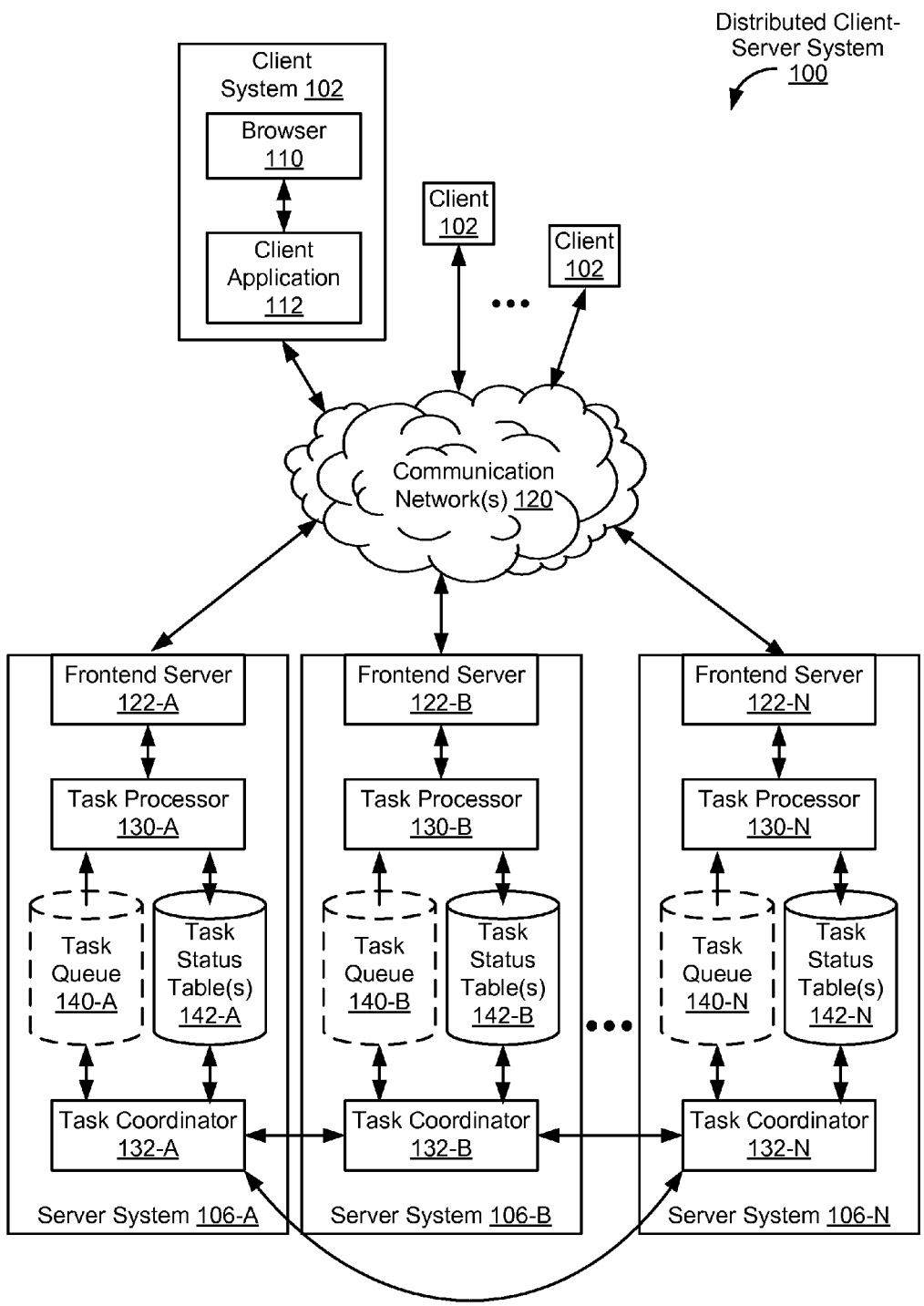
FIG. 1 is a block diagram illustrating a distributed client-server system, in accordance with some embodiments.

FIG. 1 includes a block diagram illustrating an example of distributed client-server system 100 for scheduling tasks. System 100 includes one or more Client System(s) 102 (also referred to herein as "Client 102"), a plurality of Server Systems 106 (also referred to individually as "Server 106") and a Communication Network 120 for connecting Client System(s) 102 to Server Systems 106. When the term Server 106 is used herein, it refers to the operation of a representative one of Server Systems 106 and refers to functions, all or a subset of which are performed at different times by various different server systems (e.g., Server Systems 106-A, 106-B and 106-N shown in FIG. 1). Communication Network 120 optionally includes the Internet, one or more local area networks (LANs), one or more wide area networks (WANs), other types of networks, or a combination of such networks.

A Client 102 optionally includes a Browser 110 and a Client Application 112. Browser 110 can be a general purpose Internet browser (sometimes called a Web browser) having a browser window used for displaying a web application that generates tasks for execution by Server 106. A web application user interface is optionally implemented using hypertext markup language (HTML) or extensible markup language (XML) elements that are rendered by Browser 110. Alternatively, a standalone Client Application 112 generates requests to be processed by Server 106. In some embodiments Client 102 is an end-user device (e.g., a smartphone, tablet computer, personal computer, etc.). In other embodiments Client 102 is a server that is running one or more applications that generate tasks for execution by a respective Server 106. After a user performs an operation at Browser 110 or a stand-alone Client Application 112, Client 102 relays a request to perform a task corresponding to the operation to Server 106 via Communication Network 120. Server 106 processes the response by performing the task, generates a response to the request and sends the response back to Client 102. Client Application 112 and/or Browser 110, optionally, use the response to render an updated application state at Client 102.

A respective Server System 106 (e.g., Server System 106-A, Server System 106-B or Server System 106-N) includes Frontend Server 122, Task Processor 130, Task Coordinator 132; optionally Task Queue 140 and Task Status Table(s) 142.

Task Processor 130 performs task-management operations to manage the assignment of tasks to Task Queue 140 based on information stored in Task Status Tables 142. Task Coordinators 132 determines task-status information corresponding to the status of tasks at the respective Server 106 (e.g., Server 106-A) and transmits task-status messages corresponding to the task-status information to task coordinators at other server systems (e.g., Server 106-B and Server 106-N).

Thus, when Client 102 sends a request to Server 106-A, Server 106-B and Server 106-N, the respective Frontend Servers 122 receive the request and forward the request to respective Task Processors 130, each of which optionally places a corresponding task in its Task Queue 140. In some embodiments, the first server to place the task in its Task Queue 140 sends a message to the other server systems via Task Coordinator 132 indicating that it has placed the task in its queue, and the task coordinators at the other server systems, record this information and forgo storing the task in their respective task queues. In other embodiments, the other server systems also place the task in their respective task queues, and the first server to begin processing the task sends a message to the other server systems via Task Coordinator 132 indicating that it has undertaken processing of the task, and the task coordinators at the other server systems, record this information and forgo processing the task. In some embodiments, the other server systems process the task, but prior to sending a response to the requesting client (e.g., the client from which the request to perform the task was received), the first server to respond to the request sends a message to the other server systems via Task Coordinator 132 indicating that it has responded to the request or will respond to the request, and the task coordinators at the other server systems, record this information and forgo responding to the request.

One of the Servers 106 (e.g., the respective server that indicated to the other server systems that it would respond to the request) generates a response to the request and Frontend Server 122, passes the response to Client 102 (i.e., to the requesting Client 102 which submitted the request to Servers 106) via Communication Network 120. In some circumstances, Client 102 uses the response to generate an end result for a user, such as changing display of an application at Client 102 (e.g., via Browser 110 or Client Application 112).

Figure 2:
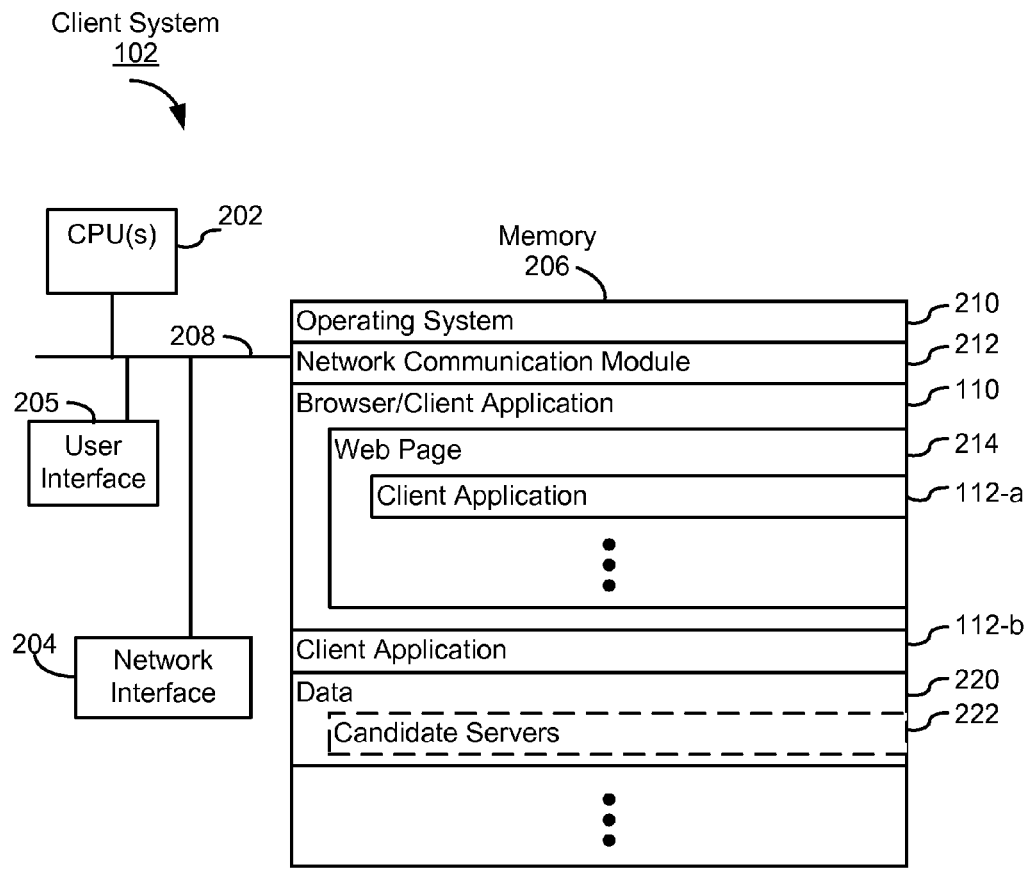
FIG. 2 is a block diagram illustrating a client system, in accordance with some embodiments.

FIG. 2 is a block diagram illustrating a Client System 102 in accordance with some embodiments. Client 102 includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212 that is used for connecting Client 102 to other computers (e.g., Server 106) via one or more Network Interfaces 204 (wired or wireless) and one or more Communication Networks 120 (FIG. 1), such as the Internet, other wide area networks, local area networks, metropolitan area networks, and so on;
- Web Browser 110 for loading Web Page 214, which optionally includes the code for a Client Application 112-a, sometimes called an embedded web application; execution of Client Application 112-a by Client 102 causes Client 102 to send requests to Server 106 and to display information corresponding to responses received from Server 106;
- dedicated Client Application 112-b (e.g., a stand-alone email client) for sending requests to Server 106 and, in at least some circumstances, displaying information corresponding to responses received from Server 106; and
- optionally, Data 220 such as data corresponding to Candidate Servers 222 (e.g., servers that are able to provide different services, such as a list of servers that stores particular files or a list of servers that provides spell checking services, etc.), used to determine which servers to send requests to and which server identifiers to include in requests.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 optionally stores additional modules and data structures not described above.

Figure 3:
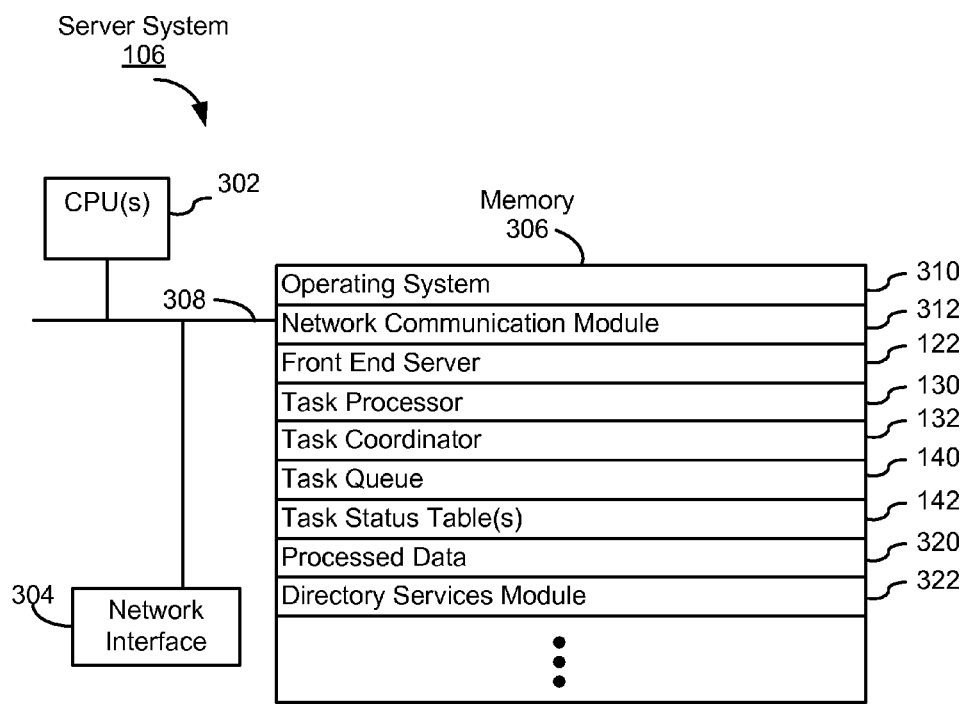
FIG. 3 is a block diagram illustrating a server system, in accordance with some embodiments.

FIG. 3 is a block diagram illustrating a Server System 106 in accordance with some embodiments. Server System 106 includes one or more processing units CPU(s) 302, one or more network or other Communications Interfaces 308, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- Operating System 310 that includes procedures for handling various basic system services and for performing hardware dependent tasks;
- Network Communication Module (or instructions) 312 that is used for connecting Server 106 to other computers (e.g., Client 102) via one or more Network Interfaces 304 (wired or wireless) and one or more Communication Networks 102 (FIG. 1), such as the Internet, other wide area networks, local area networks, metropolitan area networks, and so on;

Frontend Server 122 for coordinating communication between Server 106, Clients 102 and any other computer systems with which Server 106 communicates;

Task Processor 130 for determining whether to begin processing tasks or place tasks in Task Queue 140 for later processing;

Task Coordinator 132 for providing task status information (e.g., via processing-status messages) to other server systems that may have received redundant requests enabling the other server systems to cancel the redundant requests;

optionally, Task Queue 140 storing tasks that are ready to be processed;

one or more Task Status Tables 142 indicating the status of tasks at other server systems;

Processed Data 320 corresponding to requests from clients, where the processed data is used to generate responses to the client requests; and Directory Services Module 322, which stores information indicating services that are provided by different servers, so as to provide Client 102 with information enabling Client 102 to identify candidate servers for respective requests.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows a "Server System" 106, FIG. 3 is intended more as functional description of the various features that may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Server System 106 and how features are allocated among them will vary from one implementation to another, and optionally depends in part on the amount of data traffic that the system must handle during peak usage periods as well as during average usage periods.

Task Status Tables

FIG. 4 includes block diagrams illustrating task status tables and task queues for a plurality of tasks at a plurality of servers, in accordance with some embodiments. As shown in FIG. 4, the example Task Status Tables 142 include a plurality of entries, each including a Request ID 402 identifying the request, a Server ID 404 identifying another server that sent a processing-status message including the corresponding request ID and a Status 406 of the request at the server corresponding to the Server ID. The example Task Queues in FIG. 4 include a plurality of entries, each including a Request ID 408 identifying the request, Server IDs 410 for servers that Client 102 (e.g., the requesting client for the request) has identified as candidate Servers to which the request may also be sent, and Payloads 412 for the tasks that indicate the task to be performed once the task reaches an exit point of Task Queue 140.

Thus, by looking at all of the entries in Task Status Table 142-A for a particular request ID, Server 106-A can determine a status of the requests at other server systems. For example, Server 106-A can determine that Server 106-D has finished processing request 7 and thus may determine not to process request 7 when it reaches an exit point of Task Queue 140-A. Additionally, Task Status Table 142-A includes status information for at least one task (e.g., Task 1) that is not included in Task Queue 140-A, either because the corresponding task request message has not yet been successfully transmitted to Server 106-A or because the task has already been removed from Task Queue 140-A. Additionally, Server 106-A (or Task Coordinator 132-A in FIG. 1) has sent task-status messages indicating its status with respect to at least one task (e.g., task 19 and task 11) to Server 106-B, and thus the Task Status Table 142-B for Server 106-B indicates the status of this task at Server 106-A.

In the example illustrated in FIG. 4, as Server 106-A processes tasks from Task Queue 140-A, Server 106-A sends updates to other server systems indicated in the Server IDs 410. For example in FIG. 4, when Server 106-A started processing task 19, it sends information to Server 106-B and Server 106-D indicating that it is processing task 19, as shown in Task Status Table 142-B. Similarly, when Server 106-B started processing task 11, it sends information to Servers 106-A, 106-C, 106-D and 106-E indicating that it is processing task 11, as shown in Task Status Table 142-A. Task Status Tables 142 and Task Queues 140 illustrated in FIG. 4 are merely examples of possible configurations of data structures, and the data structures could include more or fewer components or be arranged in a variety of different arrangements without departing from the general principles disclosed herein.

Transmission of Redundant Requests to Multiple Servers from a Single Client

Figure 5A:
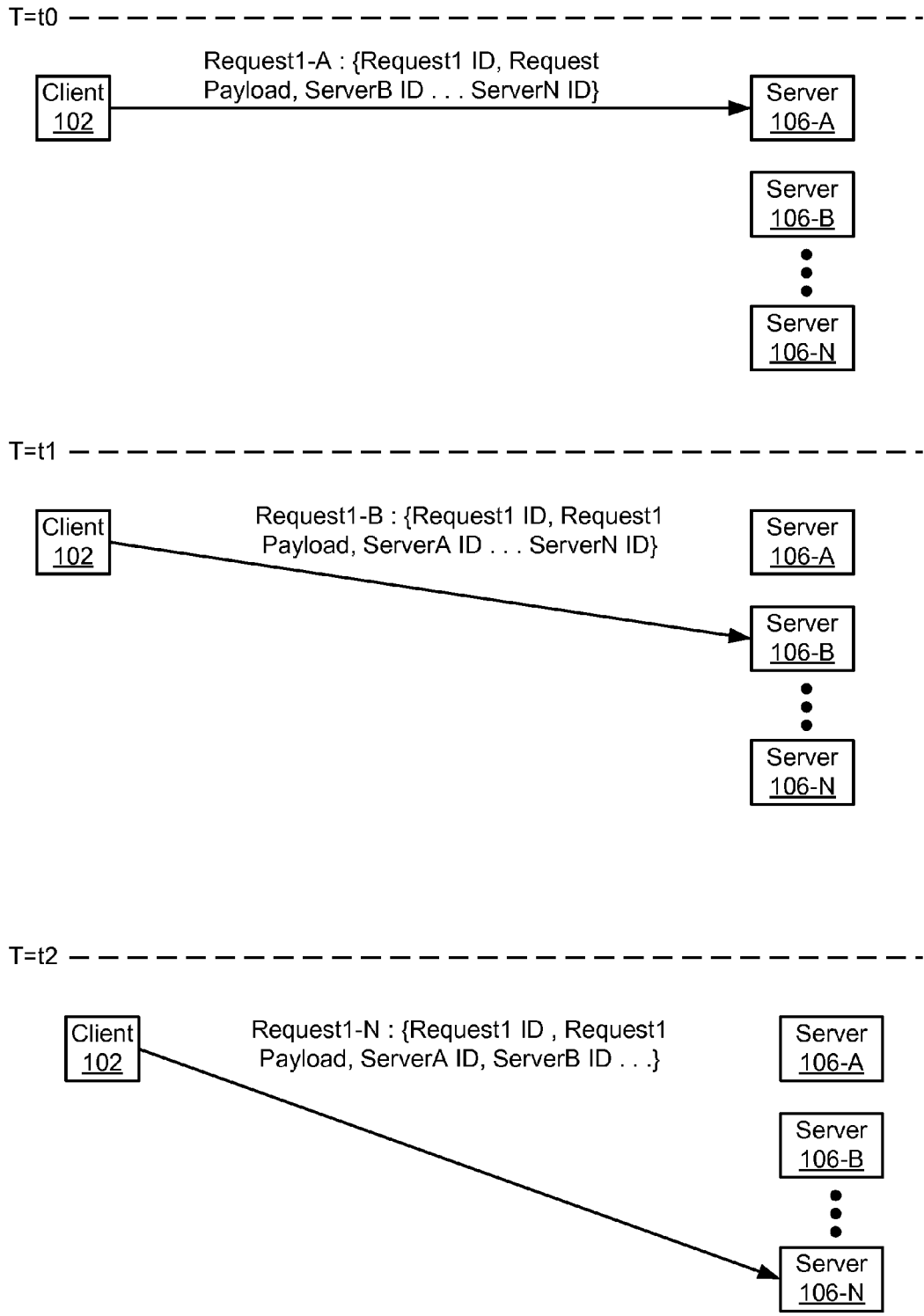
FIGS. 5A-5E include block diagrams illustrating the transmission of redundant requests to multiple servers from a single client, in accordance with some embodiments.
Figure 5B:
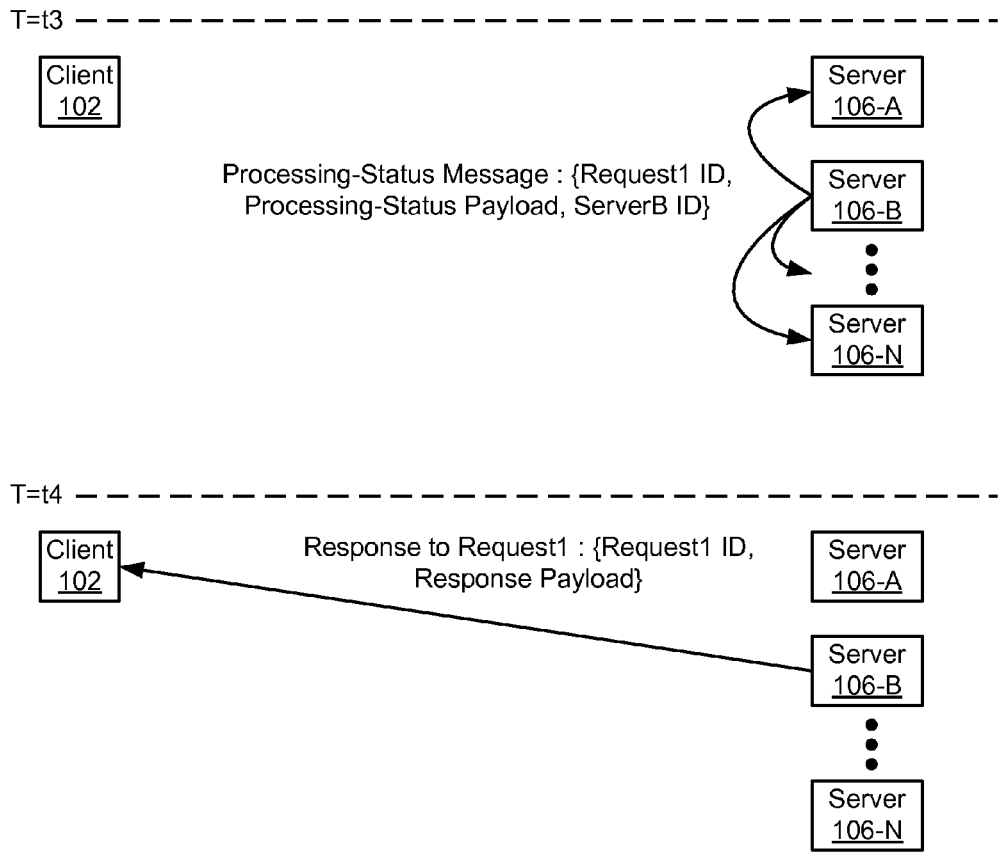

FIGS. 5A-5E include block diagrams illustrating the transmission of redundant requests to multiple servers from a single client, in accordance with some embodiments. FIGS. 5A-5B illustrate a scenario where Client 102 sends multiple simple requests to multiple Servers 106. A "simple" request, as used herein, is a request that can be satisfied by a single response from a single server, rather than a response that is combined with responses from one or more other server systems to produce a useable result. As shown in FIG. 5A, at Time=$t_0$ Client 102 sends Request1-A to Server 106-A that includes a request identifier, request payload and a plurality of server identifiers for other server systems to which the request may be sent by Client 102. After a predefined time period has elapsed without receiving a response from Server 106-A, at Time=$t_1$ Client 102 sends a subsequent request (e.g., Request1-B) to another one of the candidate servers (e.g., Server 106-B).

In some embodiments, the predefined time period is approximately equal to an amount of time that it takes for a client to send a respective request to a first server (e.g., Server 106-A) and for the first server (assuming it's task queue is otherwise empty) to send a processing-status message to other candidate servers (e.g., Server 106-B and Server 106-N)

indicating that the first server (e.g., Server 106-A) has undertaken processing of the respective request. In some implementations, the predefined time period is on the order of 1 millisecond, or about 0.5 to 2.0 milliseconds. Waiting for a predefined time period that is based on a time for a first server to send a processing-status message to other candidate servers before sending redundant copies of the respective to other candidate servers enables the other candidate servers to store status information corresponding to the respective request (e.g., in respective task status tables) prior to receiving redundant copies of the respective request. As such, in these embodiments, the other candidate servers can avoid incurring the processing costs associated with processing the redundant copies of the respective requests if the first server has already undertaken processing the request. In some embodiments, the predefined time period is approximately equal to an expected time to receive a response to the request (e.g., two times the network latency plus the expected processing time of the request, which may be on the order of 10-20 milliseconds). Waiting for a predefined time period that is based on a an expected time to receive a response to the request enables Client 102 to avoid incurring the network transmission cost associated with transmitting multiple requests to other candidate servers when the request is timely processed by the first server to which it is sent.

In some implementations, the predefined time period ($t_1$-$t_0$) (e.g., the "delay" between sending subsequent redundant data requests) is shorter or longer than the aforementioned "two times the network latency plus the expected processing time of the request." For example, in some implementations, the Client 102 issues an additional request every R (e.g., 300) milliseconds until a response is received from any of the servers to which the request has been sent, without regard to the actual network latency time or the expected processing time of the request, where R is a value that is, in some implementations, greater than 50 and less than 1000. In yet other implementations, M requests are sent by Client 102 "in parallel" to distinct Servers 106, where M is greater than 1 (and optionally less than 10), and "in parallel" means that the requests are sent at essentially the same time (e.g., all M requests are transmitted within a period of time that is, in some embodiments, 2 milliseconds or less).

In some embodiments the delay between sending subsequent redundant requests to different candidate server systems is based on activity observed by Client 102 instead of, or in addition to, a time-based determination. In some implementations, when Client 102 has sent requests to process a batch of requests and has received responses to all of the requests other than a small set of straggler requests, Client 102 determines that additional "backup" requests for the straggler requests are to be sent to additional candidate servers. In some embodiments, the small set of straggler requests is defined with respect to a "straggler threshold," where the straggler threshold corresponds either a predefined number of straggler requests (e.g., 5 requests) or a percentage of the total requests in the batch of requests that are straggler requests (e.g., a value between 1%-10% of the total number of requests in the batch of requests). Thus, in these embodiments, when the total number of outstanding requests is at or below the straggler threshold, Client 102 determines that responses to all of the requests in the batch other than a small set of straggler requests have been received.

As one example, Client 102 sends out one hundred separate requests (each to a single respective server system, or alternatively each to a redundant set of server systems). In this example, rather than using a fixed time-based delay to determine when to send the subsequent "backup" request to additional candidate server systems, Client 102 uses a policy that sends backup requests to additional candidate servers in accordance with a determination that a fixed time period R has elapsed or that responses to all but 5 of the outstanding requests have been received. Sending redundant data requests based on observed activity, as described above, is advantageous in many situations, because it enables Client 102 to allocate additional resources to straggler requests when the straggler requests are delaying performance of a subsequent operation that is based on responses a large batch of requests that includes the straggler requests. Such situations are particularly likely to arise when Client 102 is an intermediary computer system (e.g., an application server) that is generating a final response for an end-user client computer system based on intermediate responses including data retrieved from a redundant set of database servers.

After another predefined time period has elapsed without receiving a response to either the request or the subsequent request (e.g., a response from Server 106-B or Server 106-A), at Time=$t_2$ Client 102 sends another request (e.g., Request1-N) to another candidate server (e.g., Server 106-N). In some embodiments, this process continues until Client 102 has sent the request to a predefined number of servers or has received a response. While each of these requests includes the same request ID (e.g., Request1 ID) and the same request payload (e.g., Request1 Payload), the requests are each slightly different, in that they include a list of the server IDs for the other severs to which a redundant request may be sent by Client 102.

Thus, as of time Time=$t_2$ at least three candidate servers Server 106-A, Server 106-B and Server 106-N have each received a redundant request with the same request ID and the same payload. At Time=$t_3$ Server 106-B determines that it is going to process (or finishes processing) the task received from Client 102 and sends a processing-status message including the request ID and a processing-status payload to the other candidate servers that Client 102 indicated might have received redundant copies of the request. In this example, the processing-status message includes the request ID for the request and information about the status of the request at Server 106-B and an identifier for Server B indicating that the status is associated with Server B. In this example the other server systems (e.g., Servers 106-A, 106-N) perform a task-scheduling action such as stopping or delaying processing of the request. At Time=$t_4$ Server 106-B transmits a response to the request to Client 102 that includes the request ID and a response payload including retrieved data or processed data.

Figure 5C:
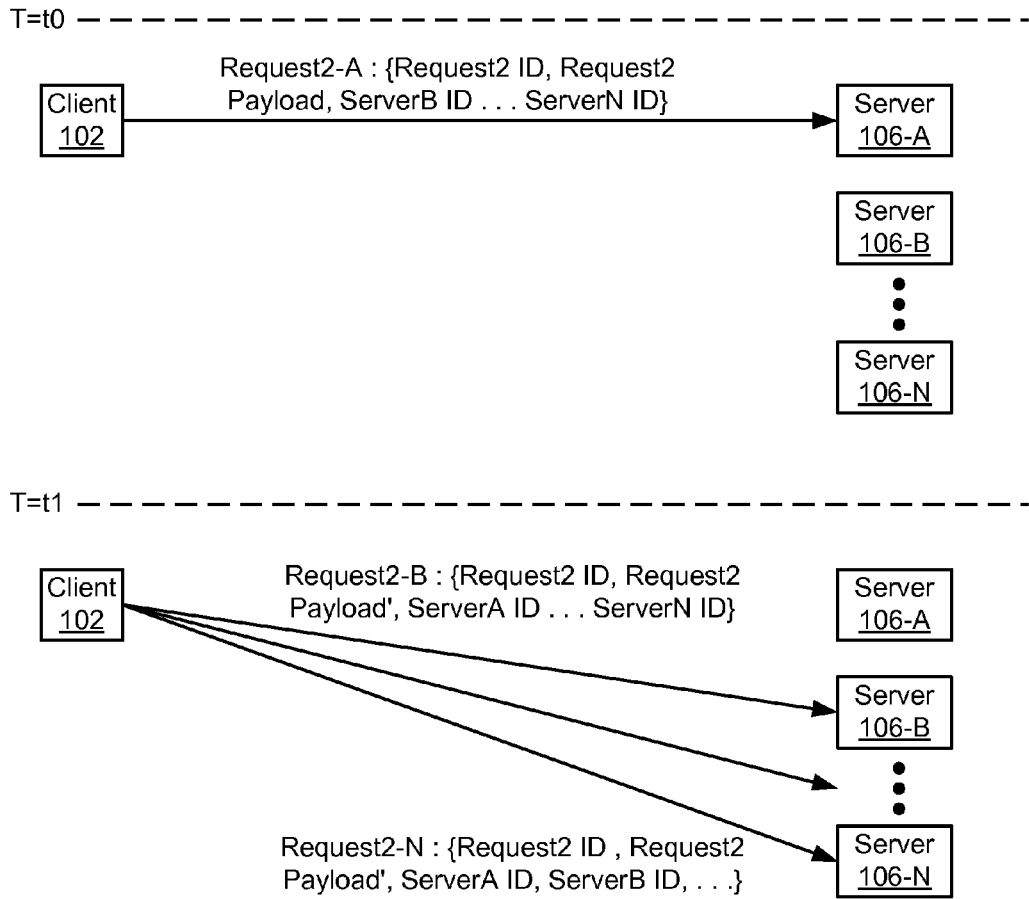
Figure 5D:
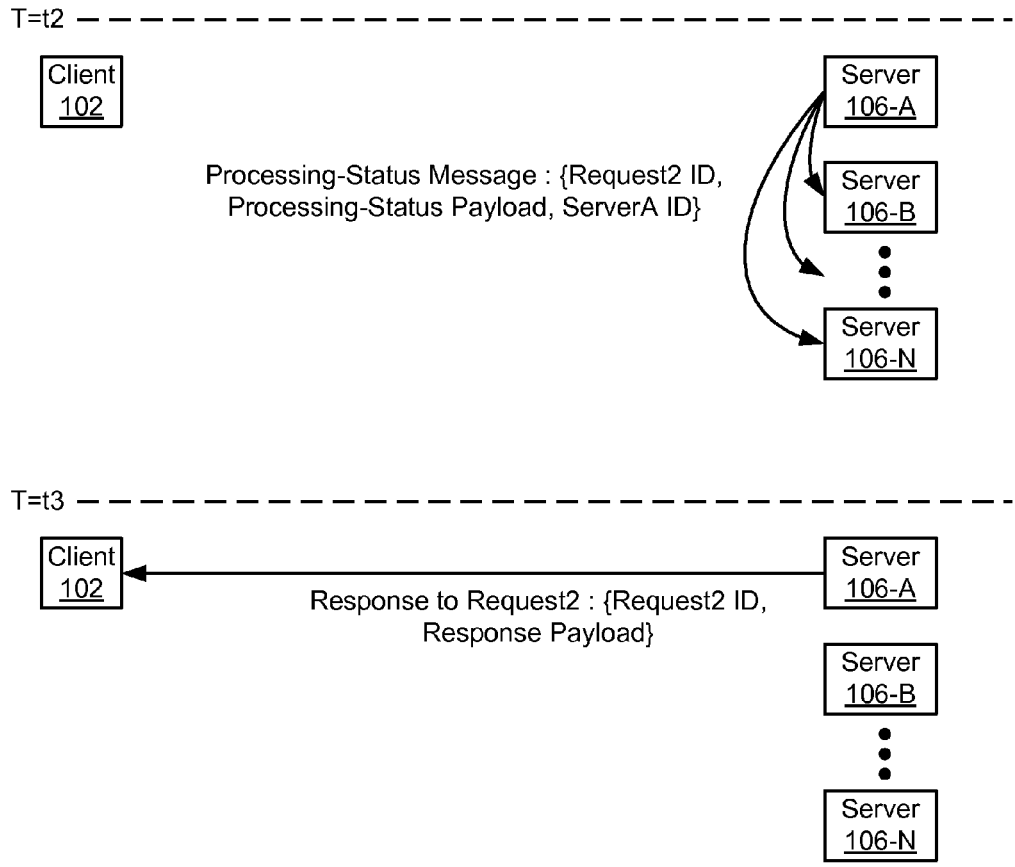
Figure 5E:
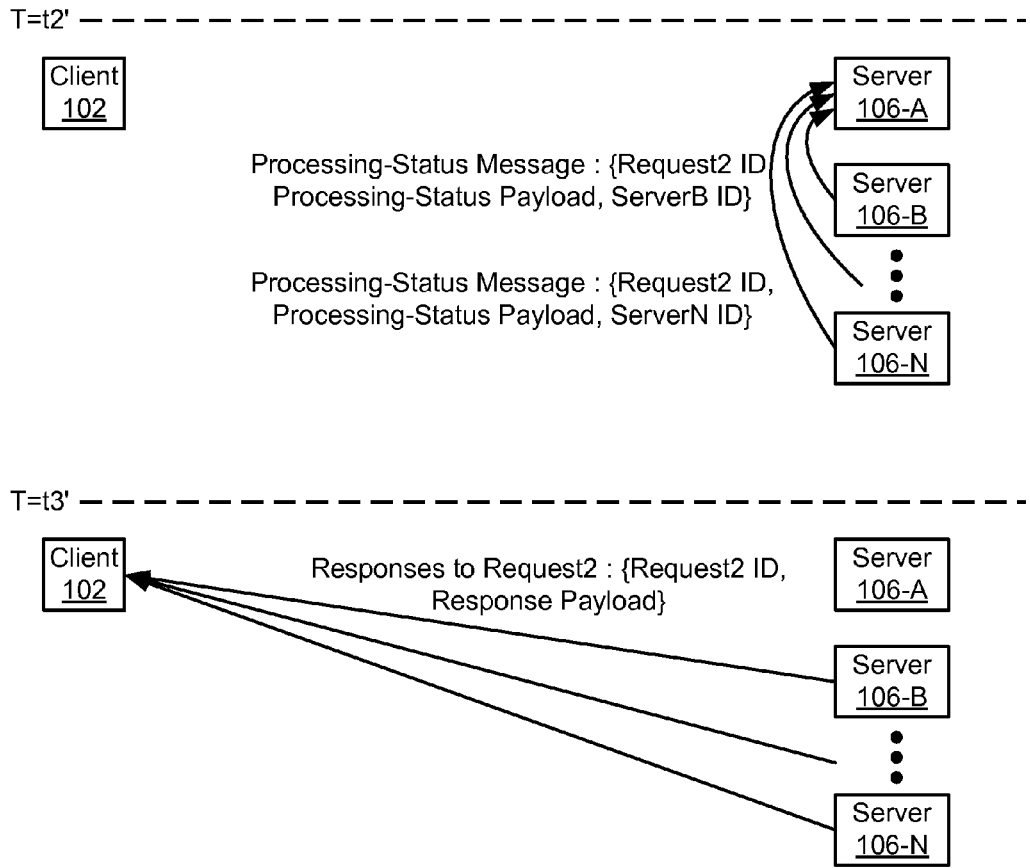

FIGS. 5C-5E illustrate a scenario where Client 102 sends a simple request to Server 106-A and a divided request to multiple other server systems. A "divided" request, as used herein, is a request that cannot be satisfied by a single response from a single server and instead two or more responses to the request are combined to produce a useable result. As one example a divided request includes a request for one or more portions of a data file and file reconstruction data components that can be combined to reconstruct the data file using Reed-Solomon encoding. A common use of Reed-Solomon type encoding is for Redundant Array of Independent Disks storage systems, commonly referred to as RAID arrays. In the example illustrated in FIG. 5C, at Time=$t_0$ Client 102 sends a simple request (e.g., Request2-A) to Server 106-A, the simple request includes a request identifier (e.g., Request2 ID) a request payload (e.g., Request2 Payload) and identifiers of candidate servers, which optionally indicates that a group of two or more of the candidate servers may be sent a divided request. After a predefined time period has elapsed without receiving a response from Server 106-A (e.g., a time that approximately equal to two times the network latency plus the expected processing time of the request), at Time=$t_1$ Client 102 sends a divided request (e.g., Request2-B) to a plurality of servers (e.g., Servers 106-B and 106-N). The divided request includes the request identifier (e.g., Request2 ID), request payload (Request2 Payload') and an identifier for the server (e.g., Server 106-A) to which the simple request was sent and, optionally, identifiers for other server systems including the other server systems to which the divided request was sent.

In some embodiments, the Request2 Payload sent to Server 106-A as part of the simple request is different from the Request2 Payload' sent to Server 106-B and Server 106-N as part of the divided request. Additionally, in some implementations the servers (e.g., Servers 106-B and 106-N) that receive the divided request are each sent an individualized request that includes a different request payload (e.g., Server 106-B is requested to provide a first portion of a data file and Server 106-N is requested to provide a second portion of the data file or data file reconstruction component that is different from the first portion). Additionally, in some embodiments, the divided request sent to the other server systems does not include all of the identifiers of the other server systems to which the divided request was sent. For example, in some implementations, the divided request includes only the identifier for the server(s) (e.g., Server 106-A) to which the simple request was sent, so that the server(s) to which the simple request was sent can determine whether enough of the servers to which the divided request was sent have responded so that it is no longer necessary to process the simple request.

In one situation, where a server (e.g., Server 106-A) to which the simple request was sent finishes processing the simple request before the servers (e.g., Servers 106-B and 106-N) to which the divided request was sent finish processing the divided request, the server to which the simple request was sent (e.g., Server 106-A) sends a processing-status message at Time=$t_2$ to the servers (e.g., Servers 106-B and 106-N) to which the divided request was sent. In this example, the processing-status message includes the request ID for the request and information about the status of the request at Server 106-A and an identifier for Server A indicating that the status is associated with Server A. This processing-status message enables the servers to which the divided request was sent to perform a task-scheduling action such as stopping processing of the divided request. At Time=$t_3$ Server 106-A transmits a response to the request that includes the request ID and a response payload including retrieved data or processed data.

In another situation, depicted in FIG. 5E, where the servers (e.g., Server 106-B and 106-N) to which the divided request was sent finish processing the divided request before the server (e.g., Server 106-A) to which the simple request was sent finishes processing the simple request, Servers 106-B and 106-N send, at Time=$t_{2'}$, respective processing-status messages to the server (e.g., Server 106-A) to which the simple request was sent. In this example, these processing-status messages each include the request ID for the request and information about the status of the request at a respective server to which the divided request was sent the respective server. These processing-status messages enable the server (e.g., Server 106-A) to which the simple request was sent to perform a task-scheduling action such as stopping processing the simple request. Subsequently, in the example illustrated in FIG. 5E, at Time=$t_{3'}$ the servers to which the divided request was sent (e.g., Servers 106-B and 106-N) transmit respective responses to the divided request that include the request ID and a response payload including retrieved data or processed data. It should be noted, that in this example, the respective responses from Server 106-B and Server 106-N have different response payloads, which are combined at Client 102 to generate a useable result.

Additionally, in some embodiments, a plurality of respective servers that received the divided request each send processing-status messages to one or more other servers indicating current status of processing the request at the respective server. Furthermore, in some implementations, the responses from the servers that received the divided request are sent to the requesting Client 102 when the respective server is done processing the request without waiting to determine whether other server systems to which the divided request was sent have also finished processing their portion of the divided request. In other implementations, the respective servers to which the divided request was sent wait to send a response to Client 102 until they have information indicating that the servers can collectively provide a complete response to the divided request.

The examples of redundant data requests with cancellation illustrated in FIGS. 5A-5E are merely examples, and the requests an responses could be made to and from a different number of servers and could be timed differently without departing from the general principles disclosed herein. Additionally, the simple and divided requests could be combined so that an arbitrary number (e.g., one or more) of simple requests are sent to one or more servers and an arbitrary number (e.g., one or more) of divided requests are sent to one or more groups of servers by a Client 102. An advantage of the requesting client sending information to servers that indicates which other server systems may be working on the task and providing a consistent identifier for the redundant copies of the task is that the requesting client can request many redundant copies of the task without unduly burdening the servers, as the servers can intelligently allocate processing resources by cancelling or reducing priority of redundant requests, as necessary.

Processing Redundant Data Requests with Cancellation

Figure 6:
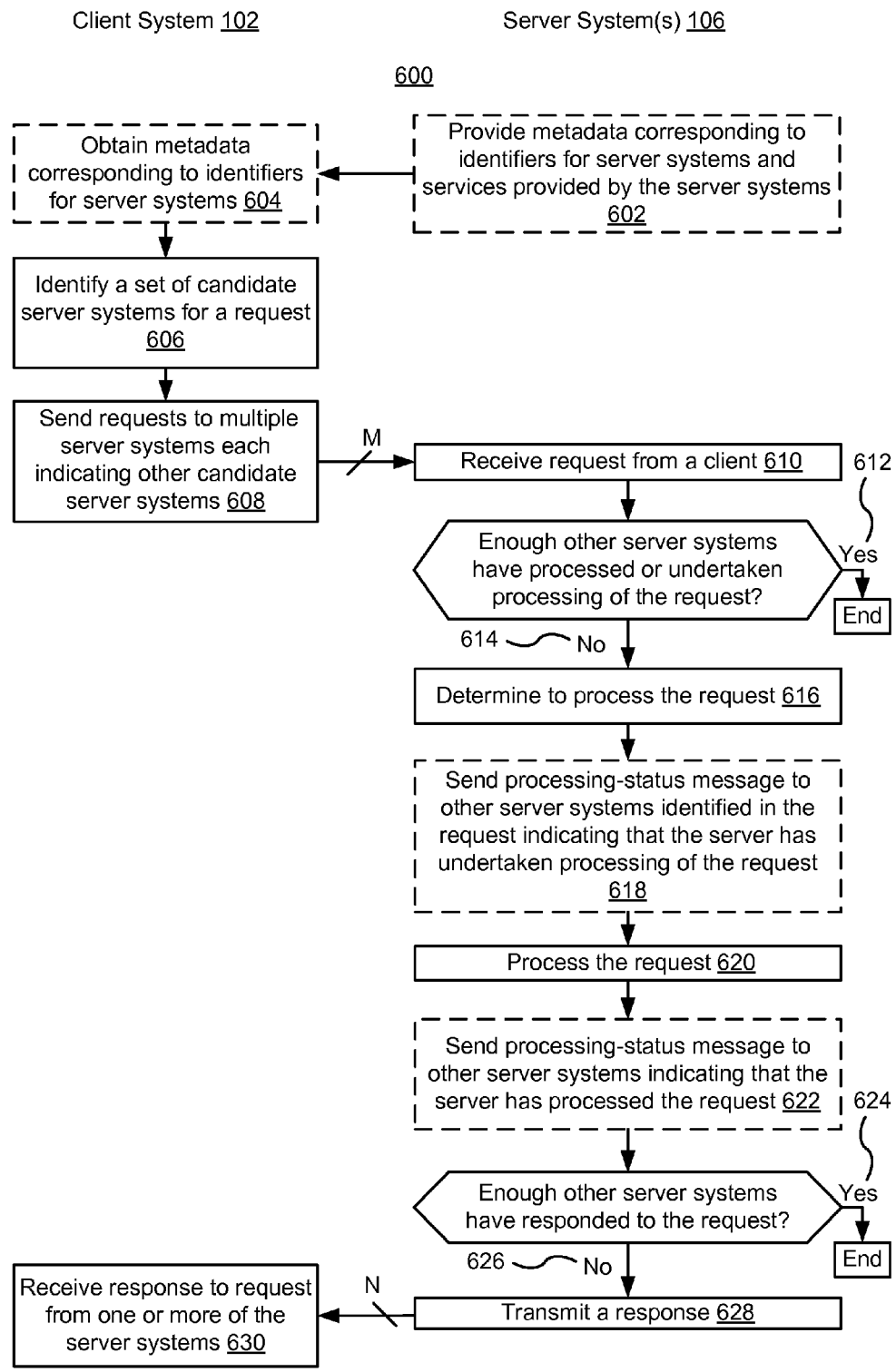
FIG. 6 includes a flow chart illustrating a method for processing redundant data requests with cancellation, in accordance with some embodiments.

FIG. 6 includes a flowchart representing a method 600 for processing redundant data requests with cancellation, in accordance with some embodiments. Method 600 is optionally governed by instructions that are stored in a non-transitory computer readable storage medium and that are executed by one or more processors of one or more computer systems (e.g., Client 102 in FIG. 2 and/or Server 106 in FIG. 3). Each of the operations shown in FIG. 6 optionally corresponds to instructions stored in a computer memory or non-transitory computer readable storage medium (e.g., memory 206 of Client 102 in FIG. 2 and/or memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 600 may be combined and/or the order of some operations may be changed from the order shown in FIG. 6.

In some embodiments, Server 106 (or Directory Services Module 322 in FIG. 3) provides metadata corresponding to identifiers for server systems and services provided by the server systems. In some embodiments, a plurality of respective Servers 106 each provide Client 102 with information about the services provided by a respective Server 106 (e.g., data files that are stored at the respective Server 106 and/or data processing services such as spell checking that are provided by the respective Server 106). In some implementations, a respective Server 106 provides information about the services provided by a plurality of Servers 106; for example, this information may be collected by the respective Server 106 from other server systems. In some embodiments, Client 106 obtains (604) the metadata corresponding to identifiers for server systems. In some embodiments, this metadata is obtained by request from one or more of Servers 106.

Client 102 identifies (606) a set of candidate server systems for a request. For example Client 102 uses the metadata corresponding to identifiers for server systems to identify respective servers that include data or provide services that enable the respective servers to respond to the request. In some embodiments, the identified set of candidate servers includes all servers that have data and/or provide services that enable the servers to respond to the request. In some embodiments, the identified set of candidate servers includes only a subset of servers that have data and/or services that enable the servers to respond to the request. For example, Client 102 may limit the number of candidate servers to a number between 2 and 10 so as to reduce the number of requests that are sent out and to reduce the number of processing-status messages that will be sent between the candidate servers.

Client 102 sends (608) requests to multiple server systems (e.g., M server systems, where M>1) where a plurality of the respective requests indicate other candidate server systems to which a redundant copy of the request has been or possibly will be sent. Client 102 may not actually send a redundant copy of the request to all of the candidate server systems, because Client 102 may receive a response or status update from one of the server systems to which a previous request had been sent. As described in greater detail above with reference to FIGS. 5A-5E, the requests are, optionally, sent in parallel or in sequence to any number of Servers 106.

A respective Server 106 receives (610) the request from Client 102. Server 106 determines whether enough other server systems have processed or have undertaken processing of the request. In some embodiments, Server 106 makes this determination in accordance with the information stored in Task Status Table 142, described in greater detail above with reference to FIG. 4, based on criteria described in greater detail below with reference to FIGS. 7A-7C. In accordance with a determination that enough other systems have (612) processed or will processed the request, Server 106 forgoes processing of the request, so as to conserve computing resources for other requests that are not already being processed by other server systems. In some embodiments, Server 106 defers processing the respective request rather than forgoing processing completely, thereby allowing Server 106 to make a subsequent determination regarding processing the respective request at a later point in time when more information about the status of the corresponding request on other server systems is available. For example, in some implementations, Server 106 defers processing the respective request rather than forgoing processing completely if another server system has started processing but has not yet finished, due to the possibility that the other server system will fail to complete processing the request in a timely manner.

In accordance with a determination that enough other systems have not (614) already processed or undertaken processing of the request, Server 106 determines (616) to process the request. In some implementations, after determining to process the request and prior to processing the request, Server 106 sends (618) a processing-status message (optionally called the "processing has started" status message) to one or more other server systems identified in the request indicating that Server 106 has undertaken processing of the request. Server 106 processes (620) the request. In some embodiments, processing the request includes retrieving requested data for Client 102. In some embodiments, processing the request includes processing data received from Client 102.

In some implementations after processing the request, Server 106 sends (622) a processing-status message (optionally called the "processing completed" status message) to the other server systems identified in the request, indicating that Server 106 has processed the request. This processing-status message is, in various embodiments be sent either instead of or in addition to the processing-status message described above with reference to step 618.

After processing the request (and optionally, generating a response) Server 106 determines whether enough other server systems have responded to the request. In some embodiments, Server 106 makes this determination in accordance with the information stored in Task Status Table 142, described in greater detail above with reference to FIG. 4 based on criteria described in greater detail below with reference to FIGS. 7A-7C and 8. In accordance with a determination that enough other systems have (624) responded to the request, Server 106 forgoes responding to the request, so as to conserve network bandwidth for other network traffic.

In accordance with a determination that enough other systems have not (626) responded to the request Server 106 transmits (628) a response to the request to Client 102. Client 102 receives (630) one or more responses to the request from one or more servers. In some embodiments, Server 106 also transmits processing-status information to other server systems indicating that Server 106 has responded to the request. In some implementations, for a simple request Client 102 receives a single response (e.g., N=1). In contrast, in some implementations, for a divided request (e.g., a request for data file portions and file reconstruction data using Reed-Solomon encoding), Client receives multiple responses from different servers that, when combined, provide a useable result (e.g., N>1). In some embodiments, after receiving the response(s) from the server(s), Client 102 generates an end result for a user, such as changing display of an application, storing a file obtained from the server(s), or otherwise changing a state of Client 102.

The particular order in which the operations in FIG. 6 have been described are merely examples and are not intended to indicate that the described order is the only order in which the operations could be performed. One of ordinary skill in the art would recognize various ways to reorder the operations described herein. Additionally, details of other processes described herein with respect to methods 700, 800 and 900 (described herein with respect to FIGS. 7A-7C, 8 and 9A-9B, respectively) are also applicable in an analogous manner to method 600 described above with respect to FIG. 6. For example, the requests, responses, server identifiers, messages and operations described above with reference to method 600 may have one or more of the characteristics of the various requests, responses, server identifiers, messages and operations described herein with reference to methods 700, 800 and 900. In particular respective operations performed at Server 106 are described in greater detail with reference to methods 700 and 800, while respective operations performed at Client 102 are described in greater detail with reference to method 900. For brevity, these details are not repeated here.

Canceling Redundant Data Requests to Avoid Unnecessary Request Processing

Figure 7A:
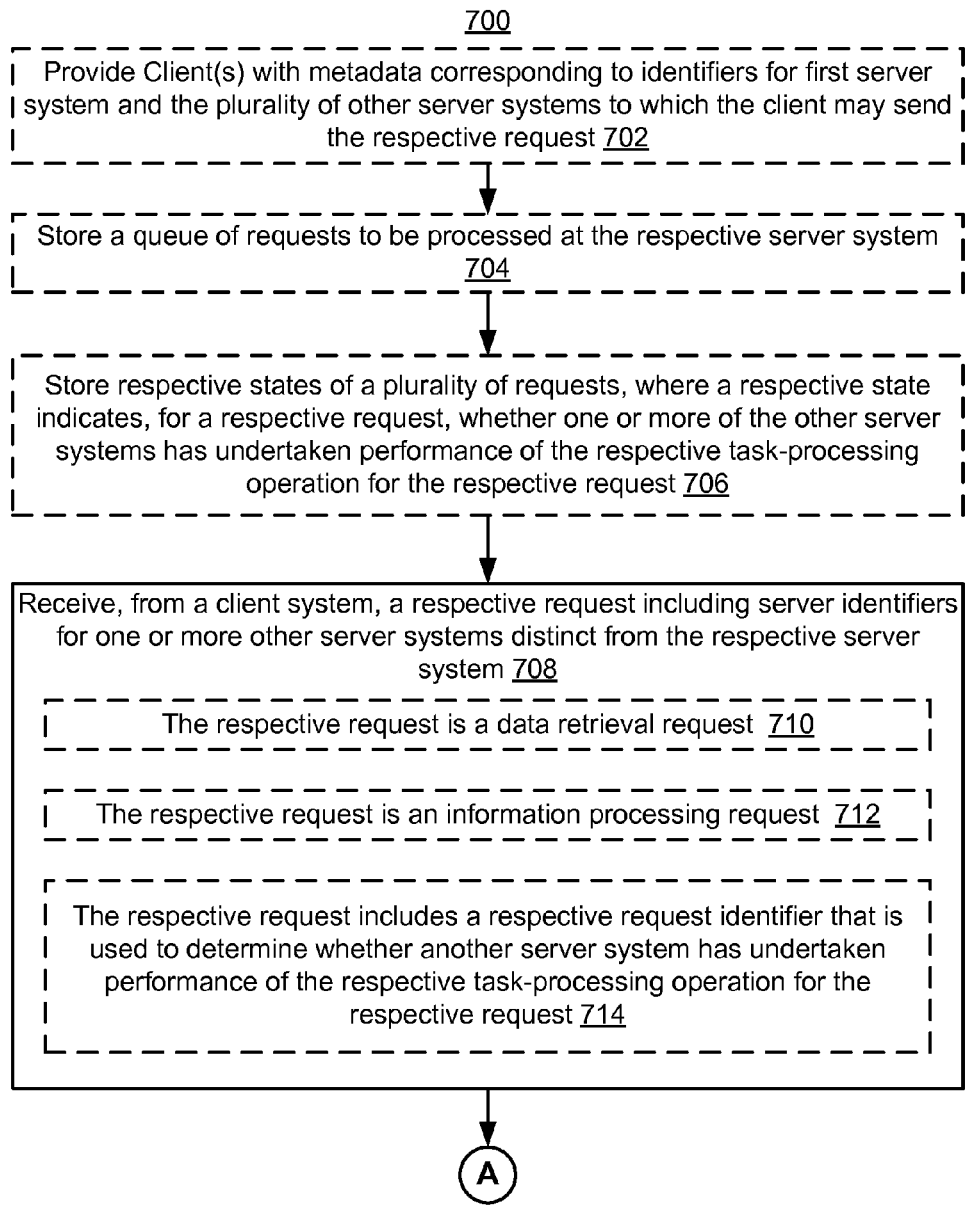
FIGS. 7A-7C include a flow chart illustrating a method for canceling redundant data requests to avoid unnecessary request processing, in accordance with some embodiments.
Figure 7B:
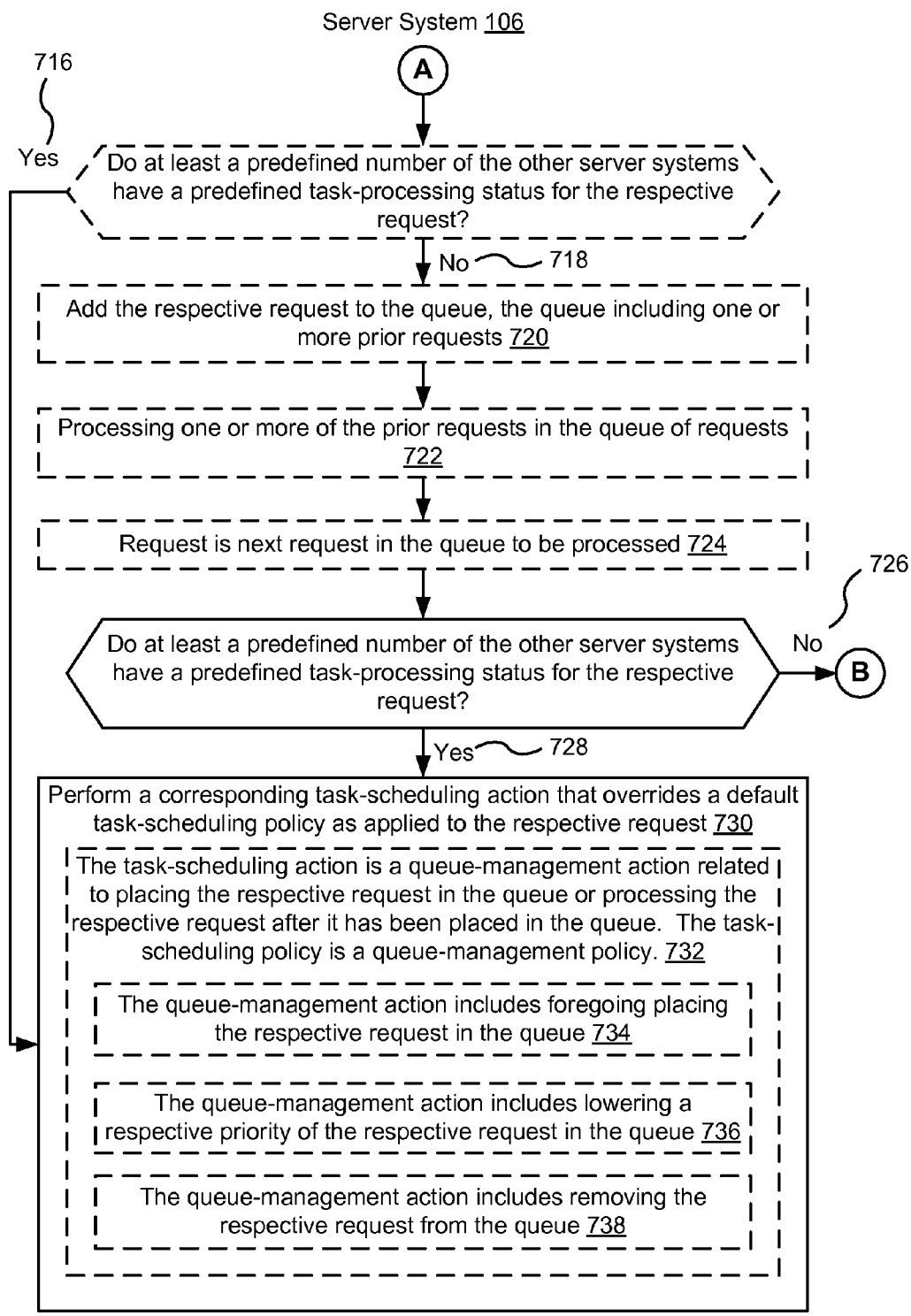
Figure 7C:
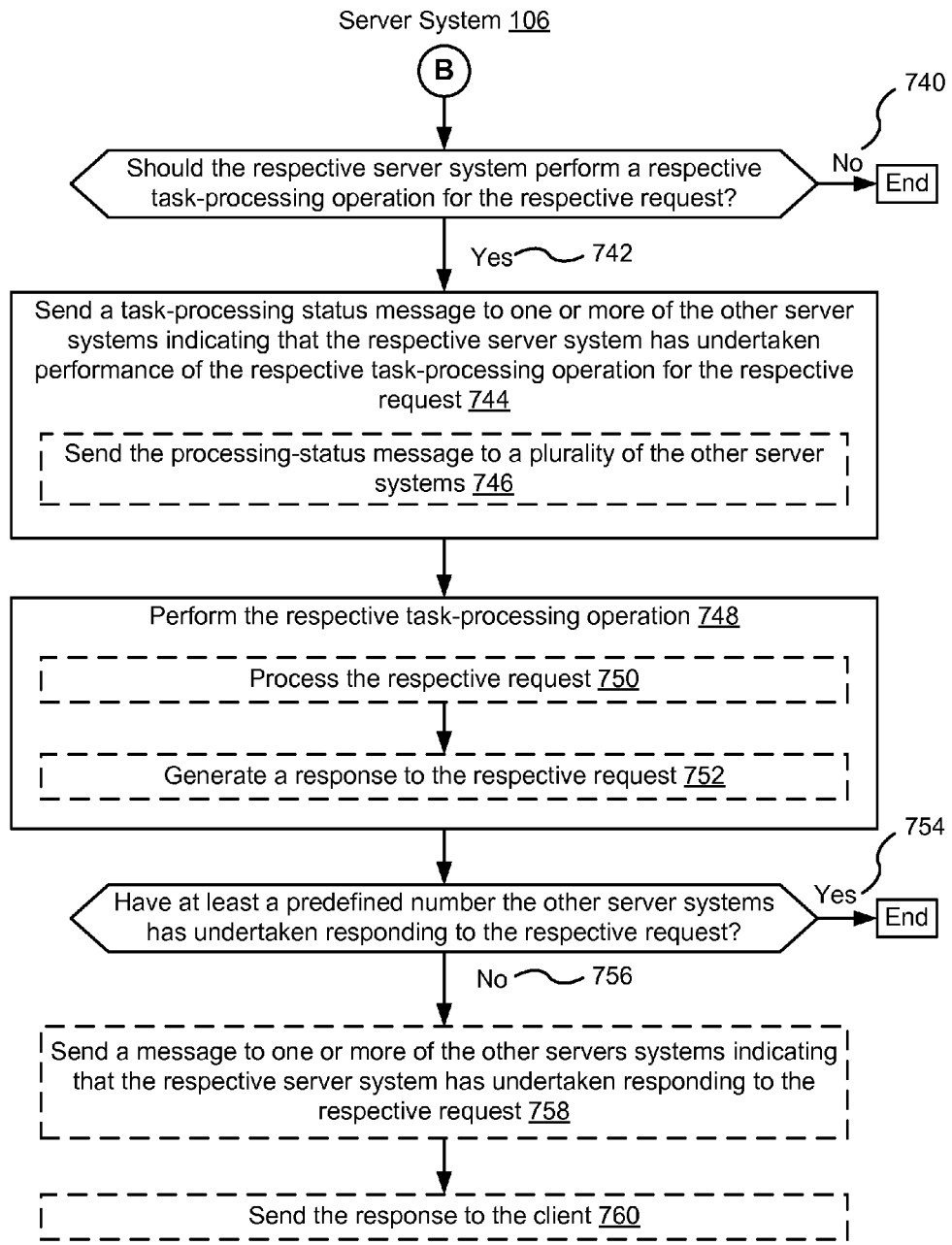

FIGS. 7A-7C include a flow chart illustrating a method 700 for canceling redundant data requests to avoid unnecessary request processing, in accordance with some embodiments. Method 700 is, optionally, governed by instructions that are stored in a non-transitory computer readable storage medium and that are executed by one or more processors of one or more computer systems (e.g., Server 106 in FIG. 3). Each of the operations shown in FIGS. 7A-7C optionally corresponds to instructions stored in a computer memory or non-transitory computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 700 may be combined and/or the order of some operations may be changed from the order shown in FIGS. 7A-7C.

In some embodiments, Server 106 (or Directory Services Module 322 in FIG. 3) provides (702) Client(s) with metadata corresponding to identifiers for first server system and the plurality of other server systems to which the client may send the respective request.

In some embodiments, Server 106 stores (704) a queue (e.g., Task Queue 140 in FIGS. 3-4) of requests to be processed at Server 106. In some implementations, Server 106 stores (706) respective states of a plurality of requests (e.g., in a data structure such as Task Status Table 142 in FIGS. 3-4), where a respective state indicates, for a respective request, whether one or more of the other server systems has undertaken performance of a particular aspect of the respective task-processing operation for the respective request. In other words, in some embodiments, Server 106 stores a table that stores a mapping from each of one or more request identifiers to a respective processing status of a corresponding request on one or more other server systems. For example, the state of a respective server (with respect to a particular request) includes one or more of: that the respective server has received the request, that the respective server has placed the request in a queue, that the respective server has scheduled the request for processing, that the respective server has assumed responsibility for (e.g., undertaken) processing the request, that the respective server is currently processing the request, that the respective server has finished processing the request, that the respective server has sent a response corresponding to the request to the requesting client, that the respective server has failed to process the request and/or that the respective server has cancelled processing of the request. Additionally, in some embodiments, the processing statuses are processing statuses that have been received in processing-status messages from other server systems and thus the processing statuses stored at a respective Server 106 may include processing statuses for requests that have not yet been received by the respective Server 106.

Server 106 (or Front End Server 122 in FIG. 3) receives (708), from Client 102, a respective request including server identifiers for one or more other server systems distinct from the respective server system. In some embodiments, the respective request is (710) a data retrieval request (e.g., a request to retrieve a data file or information for reconstructing a data file identified in the respective request). In some embodiments, the respective request is (712) an information processing request (e.g., a request to process data included in the respective request, such as a request to spell check a text string). In some embodiments, the respective request includes (714) a respective request identifier (e.g., a request identifier specified by Client 102) that is used to determine whether another server system has already undertaken performance of the respective task-processing operation for the respective request (e.g., the request identifier of the request is used to identify corresponding task processing status information in Task Status Table 142).

After receiving the respective request, Server 106 (or Task Processor 130 in FIG. 3) determines whether at least a predefined number of other server systems have a predefined task-processing status for the respective request. In some embodiments, this determination is performed prior to placing the request in a queue at Server 106. In some implementations, the predefined number is a number of server systems that will process the respective request in parallel. For example, in some situations where Client 102 does not require a high level of redundancy (e.g., redundant responses to check for errors or redundant processing to ensure fast delivery of a response), the predefined number is 1. Thus, in these situations, the determination will be whether any of the other server systems have the predefined task-processing status.

In other situations where Client 102 does requires some degree of redundancy, then the predefined number will be a value greater than 1. For example, if the predefined number is 2, then two servers will process the respective request in parallel. Additionally, larger values of the predefined numbers could be used to provide greater levels of redundancy and speed at the cost of additional computing resources being committed to repeating a single task multiple times. In some embodiments, the predefined number corresponds to a redundancy parameter that is specified by Client 102 in the request. In other embodiments, the predefined number corresponds to a redundancy parameter that is predetermined by Server 106 and applies to a plurality of different requests (e.g., requests of a particular type or requests received from a particular set of one or more clients).

In some embodiments in which Server 106 uses a task queue, in accordance with a determination, prior to placing the respective request in the task queue, that at least the predefined number of other server systems have (716) the predefined task-processing status for the respective request, Server 106 performs a corresponding task-scheduling action that overrides a default task-scheduling policy (e.g., a first-in-first-out queue policy) as applied to the respective request, as described in greater detail below with reference to operations 730-738.

In some embodiments, the determination as to whether at least the predefined number of other server systems have a predefined task-processing status for the respective request is based on whether a processing-status message has been received (e.g., by Task Coordinator 132 in FIG. 3) from another server system indicating that the other server system has undertaken performance of a task-processing operation corresponding to the predefined task-processing status for the respective request. In other words, as described in greater detail above with reference to FIG. 4, the determination is based on status information in Task Status Table 142 in FIGS. 3-4.

Determining whether at least the predefined number of other server systems have a predefined task-processing status for the respective request could be performed at any number of different times. In some embodiments, the determination as to whether at least the predefined number of other server systems have a predefined task-processing status for the respective request is performed prior to beginning to process the respective request. In some embodiments, the determination as to whether at least the predefined number of other server systems have a predefined task-processing status for the respective request is performed prior to adding the respective request to the queue. In some embodiments, determination as to whether at least the predefined number of other server systems have a predefined task-processing status for the respective request is performed after adding the respective request to the queue. Additionally, in some implementations, determining whether at least the predefined number of other server systems have a predefined task-processing status for the respective request is performed at multiple different times, such as: prior to adding the request to the task queue, prior to beginning to process the request (e.g., the request reaches an exit point of the queue), after finishing processing the request and/or prior to sending a response to Client 102.

In some embodiments, in accordance with a determination, prior to placing the respective request in the task queue, that less (718) than the predefined number of other server systems have the predefined task-processing status for the respective request, Server 106 adds (720) the respective request to a task queue including one or more prior requests. In some implementations, after adding the respective request to the task queue, Server 106 (or Task Coordinator 132 in FIG. 3) sends a task-processing status message to one or more of the other server systems indicating that the respective server system has scheduled the response for processing (e.g., by adding the respective request to Task Queue 142 in FIG. 3). In some embodiments, the request is added to the task queue without making a determination as to whether at least the predefined number of other server systems have the predefined task-processing status. After adding the respective request to the task queue, Server 106 processes (722) one or more of the prior requests in the queue of requests. Subsequently, when the respective request is (724) a next request in the queue to be processed, Server 106 determines whether at least the predefined number of other server systems have a predefined task-processing status for the respective request is performed. This determination is performed either in addition to or instead of the determination that is performed prior to adding the request to the queue.

Prior to processing the respective request (and, optionally, after placing the respective request in the queue), Server 106 determines whether at least a predefined number of other server systems have a predefined task-processing status for the respective request. In some embodiments, the determination that at least the predefined number of other server systems have a predefined task-processing status for the respective request includes a determination that multiple server systems have collectively undertaken performance of the respective task-processing operation for the respective request (e.g., in response to a divided request). In accordance with a determination, that less (726) than the predefined number of other server systems have the predefined task-processing status for the respective request, the system determines whether or not to process the respective request, as described below in greater detail with reference to operations 740-760. In contrast, in accordance with a determination, prior to processing the respective request (and, optionally, after placing the respective request in the queue), that at least the predefined number of other server systems have (728) the predefined task-processing status for the respective request, Server 106 (or Task Processor 130 in FIG. 3) performs (730) a corresponding task-scheduling action that overrides a default task-scheduling policy (e.g., a first-in-first-out policy) as applied to the respective request.

In some embodiments, the task-scheduling action is (732) a queue-management action related to placing the respective request in the queue or processing the respective request after it has been placed in the queue and the task-scheduling policy is a queue-management policy. In some embodiments, the queue-management action includes (734) forgoing placing the respective request in the queue. In some embodiments, the queue-management action includes (736) lowering a respective priority of the respective request in the queue. In some embodiments, the queue-management action includes (738) removing the respective request from the queue. Lowering a respective priority of the respective request could include any of the following: delaying processing of the request until all requests in the queue with higher priority have been processed, moving the respective request to an end of the queue, deferring placing the respective request in the queue for a predefined time period, or other operation that delays when the request will be processed.

In some implementations where a determination regarding task-processing statuses of other server systems for the respective request are made both before and after adding the respective request to a queue, the predefined number, and/or predefined task-processing status are the same for the different determining steps. In some implementations, the predefined number, and/or predefined task-processing status are different for the different determining steps. For example, prior to adding the request to the queue, Server 106 determines whether at least two other server systems have added the request to their queue and if so, the request is not added to the queue at Server 106. In contrast, when the request is at an exit point of the queue, Server 106 determines whether at least one other server has already started processing the request, and if so, delays processing of the request or cancels processing of the request. Additionally, in some embodiments, the task-scheduling action depends on the task-processing status of other server systems for the respective message. As one example of this embodiment, when the Task Status Table 142 in FIG. 4 indicates that another server has completed processing a request, the request is canceled at Server 106, as there is no possibility that the other server will fail to complete processing the request. In contrast, in this example, when the Task Status Table 142 in FIG. 4 indicates that the request is being processed by another server, Server 106 delays processing the request rather than cancelling the request, as the other server that is currently processing the request may still fail to complete processing of the request.

After receiving the request, Server 106 determines whether to perform a respective task-processing operation for the respective request. In accordance with a determination not to perform (740) the respective task-processing operation for the respective request at the respective server system, the process ends or waits for a predetermined amount of time before making a new determination as to whether Server 106 should perform the respective task-processing operation for the respective request.

In accordance with a determination to perform (742) the respective task-processing operation for the respective request, Server 106 sends (744) a processing-status message to one or more of the other server systems indicating that the respective server system has undertaken performance of the respective task-processing operation for the respective request. In some embodiments, the determination to perform a respective task-processing operation for the respective request includes a determination to process the request and is based on a determination that: the respective server system is ready to begin processing the respective request and less than the predefined number of the other server systems have begun to process the respective request. In some embodiments, sending the processing-status message indicating that the respective server system has undertaken performance of the respective task-processing operation for the respective request includes sending (746) the processing-status message to a plurality of the other server systems. In some implementations, the processing-status message is sent to each of the other server systems to let them know that they do not need to undertake processing of the respective request.

Additionally, in accordance with the determination to perform the respective task-processing operation for the respective request, Server 106 (or Task Processor 130 in FIG. 3) performs (748) the respective task-processing operation. In some embodiments, performing the respective task-processing operation includes processing (750) the respective request and generating (752) a response to the respective request.

In some embodiments, after processing the respective request (and, optionally generating a response based on the respective request), Sever 106 determines whether a predefined number the other server systems have undertaken responding to the respective request. In some embodiments, undertaking responding to a respective request includes completing processing the respective request and responding to or indicating an intention to respond to the respective request. In some implementations, a processing-status message from a respective other server that indicates that processing of a respective request has been completed is interpreted as an indication that the respective other server has undertaken responding to the respective request. In accordance with a determination that at least (754) the predefined number of the other server systems have undertaken responding to the respective request, Serve 106 forgoes sending the response to the requesting client (e.g., Client 102). In accordance with a determination that less (756) than the predefined number of the other server systems have undertaken responding to the respective request, Server 106 (or Task Coordinator 132 in FIG. 3) sends (758) a message to one or more of the other server systems (or optionally, a plurality of other server systems or all of the other server systems identified in the request) indicating that the respective server system has undertaken responding to the respective request. In some implementations, the message is sent to the other server systems using the respective request identifier for the respective request so that the other server systems can associate the message with the corresponding request.

In implementations where a determination regarding task-processing statuses of other server systems for the respective request are made both before and after processing the respective request, the predefined number, and/or predefined task-processing status are the same for the different determining steps. In some embodiments, the predefined number, and/or predefined task-processing status are different for the different determining steps. In these embodiments, there are one or more of: a first predefined number, a second predefined number and a third predefined number for the respective determining steps and there are one or more of: a first task-processing status, a second task-processing status and a third task-processing status for the respective determining steps.

As an example of using different predefined numbers and task-processing statuses for different determining steps, prior to processing the request, Server 106 determines whether at least two other server systems are processing the request and, if so, the request is processed at Server 106. In contrast, when the request has been processed but a response based on the processed request has not yet been sent to Client 102, Server 106 (or Task Processor 130 in FIG. 3) determines whether at least one other server has already sent a response to the request and, if so, cancels sending the response to Client 102. Thus, the predefined number and/or predefined task-processing status criteria used by Server 106 could be the same or different for the various determining steps (e.g., the determining steps performed prior to adding the request to the queue, the determining step after adding the request to the queue but prior to processing the request and the determining step that occurs after processing the request but prior to sending a response to the requesting client). In some implementations, the particular combination of predefined numbers and task-processing status criteria used for the different determining steps are selected based on the redundancy requirements for a particular request or requests in general and the efficiency requirements of the servers processing the requests. In some embodiments, these criteria are user-adjustable parameters. In some embodiments, these criteria are system-defined parameters.

After preparing the response (e.g., data retrieved based on the request or data processed based on the request), Server 106 sends (760) the response to the requesting client (e.g., Client 102) for use in producing an end result such as a change in display information for a user of Client 102.

The particular order in which the operations in FIGS. 7A-7C have been described are merely examples and are not intended to indicate that the described order is the only order in which the operations could be performed. One of ordinary skill in the art would recognize various ways to reorder the operations described herein. Additionally, details of other processes described herein with respect to methods 600, 800 and 900 (described herein with respect to FIGS. 6, 8 and 9A-9B, respectively) are also applicable in an analogous manner to method 700 described above with respect to FIGS. 7A-7C. For example, the requests, responses, server identifiers, messages and operations described above with reference to method 700 may have one or more of the characteristics of the various requests, responses, server identifiers, messages and operations described herein with reference to methods 600, 800 and 900. For brevity, these details are not repeated here.

Canceling Redundant Data Requests to Avoid Unnecessary Response Transmission

Figure 8:
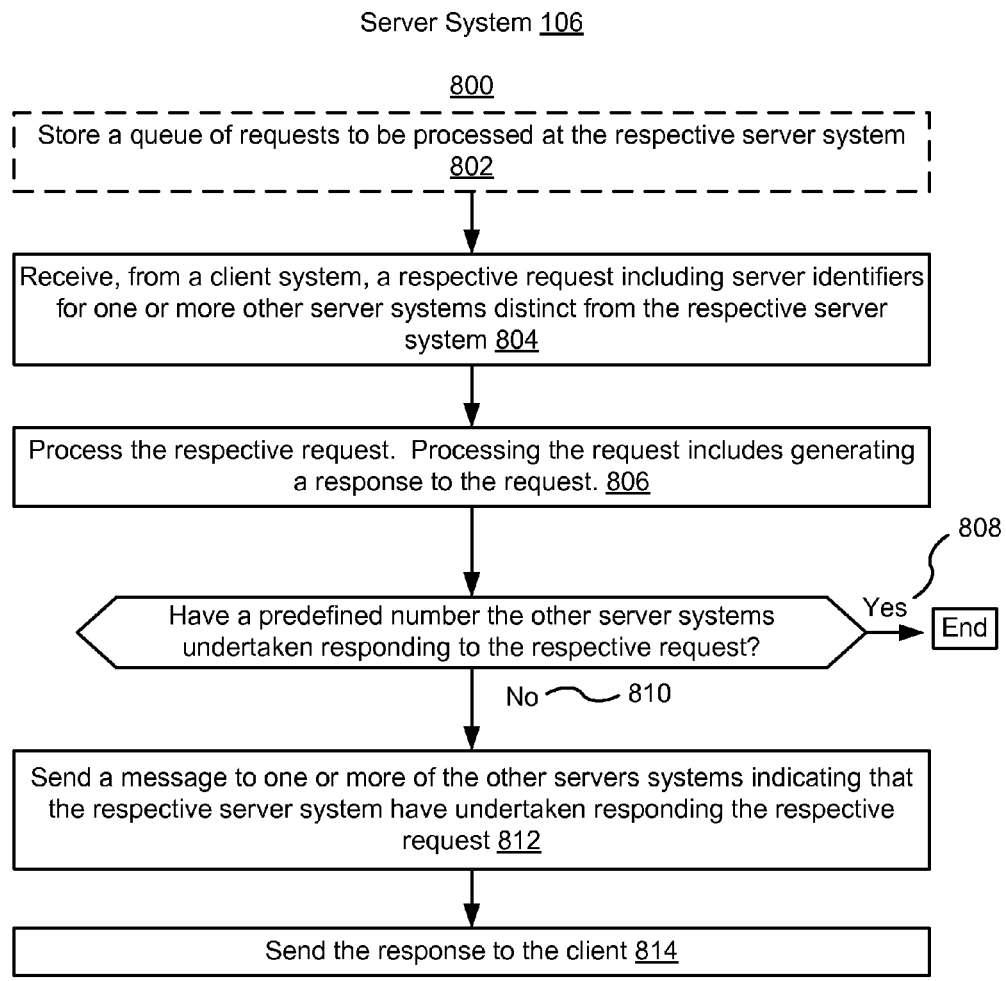
FIG. 8 includes a flow chart illustrating a method for canceling redundant data requests to avoid unnecessary response transmission, in accordance with some embodiments.

FIG. 8 includes a flow chart illustrating a method 800 for canceling redundant data requests to avoid unnecessary response transmission, in accordance with some embodiments. Method 800 is, optionally, governed by instructions that are stored in a non-transitory computer readable storage medium and that are executed by one or more processors of one or more computer systems (e.g., Server 106 in FIG. 3). In some implementations, each of the operations shown in FIG. 8 corresponds to instructions stored in a computer memory or non-transitory computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 800 may be combined and/or the order of some operations may be changed from the order shown in FIG. 8.

In some embodiments, Server 106 stores (802) a queue (e.g., Task Queue 140 in FIG. 3) of requests to be processed at Server 106. Server 106 receives (804), from a client system (e.g., Client 102), a respective request including server identifiers for one or more other server systems distinct from the respective server system. Server 106 (e.g., Task Processor 130 in FIG. 3) processes (806) the respective request, where processing the request includes generating a response to the request.

Upon completing processing of the respective request, Server 106 (e.g., Task Processor 130 in FIG. 3) determines whether a predefined number of the other server systems have undertaken responding to the respective request. In some embodiments, undertaking responding to a respective request includes completing processing the respective request and responding to or indicating an intention to respond to the respective request. In some implementations, a processing-status message from a respective other server that indicates that processing of a respective request has been completed is interpreted as an indication that the respective other server has undertaken responding to the respective request. In accordance with a determination that at least (808) the predefined number (e.g., one or more) of the other server systems previously have undertaken responding to the respective request, Server 106 forgoes sending a result of the processing to the client system. In contrast, in accordance with a determination that less (810) than the predefined number (e.g., none) of the other server systems have undertaken responding to the respective request, Server 106 sends (812) a message to one or more of the other server systems indicating that the respective server system has undertaken responding to the respective request and sends (814) the response to the requesting client system.

The particular order in which the operations in FIG. 8 have been described are merely examples and are not intended to indicate that the described order is the only order in which the operations could be performed. One of ordinary skill in the art would recognize various ways to reorder the operations described herein. Additionally, details of other processes described herein with respect to methods 600, 700 and 900 (described herein with respect to FIGS. 6, 7A-7C and 9A-9B, respectively) are also applicable in an analogous manner to method 800 described above with respect to FIG. 8. For example, the requests, responses, server identifiers, messages and operations described above with reference to method 800 may have one or more of the characteristics of the various requests, responses, server identifiers, messages and operations described herein with reference to methods 600, 700 and 900. For brevity, these details are not repeated here.

Figure 9A:
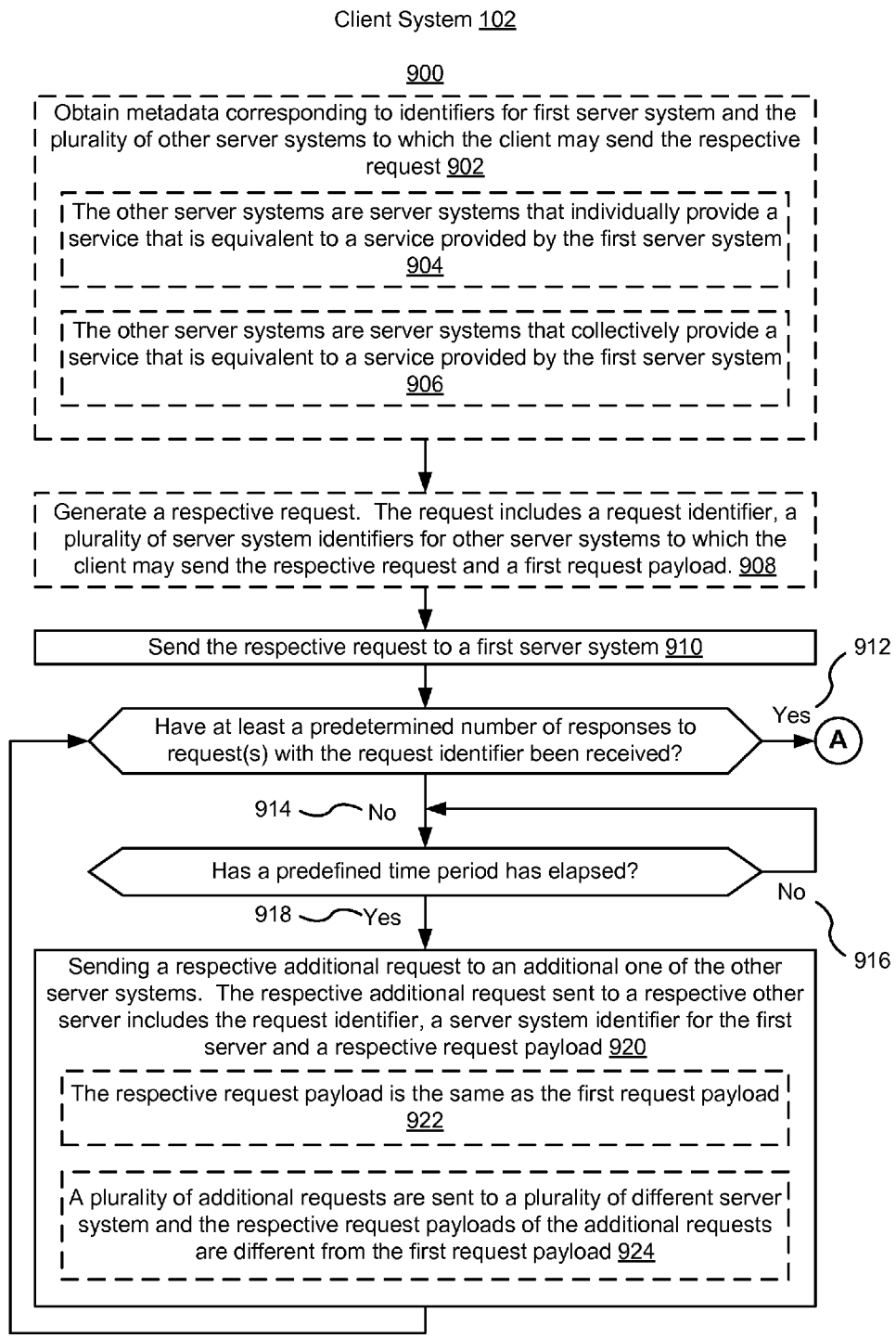
FIGS. 9A-9B include a flow chart illustrating a method for transmitting data requests including information enabling cancellation of redundant data requests, in accordance with some embodiments.
Figure 9B:
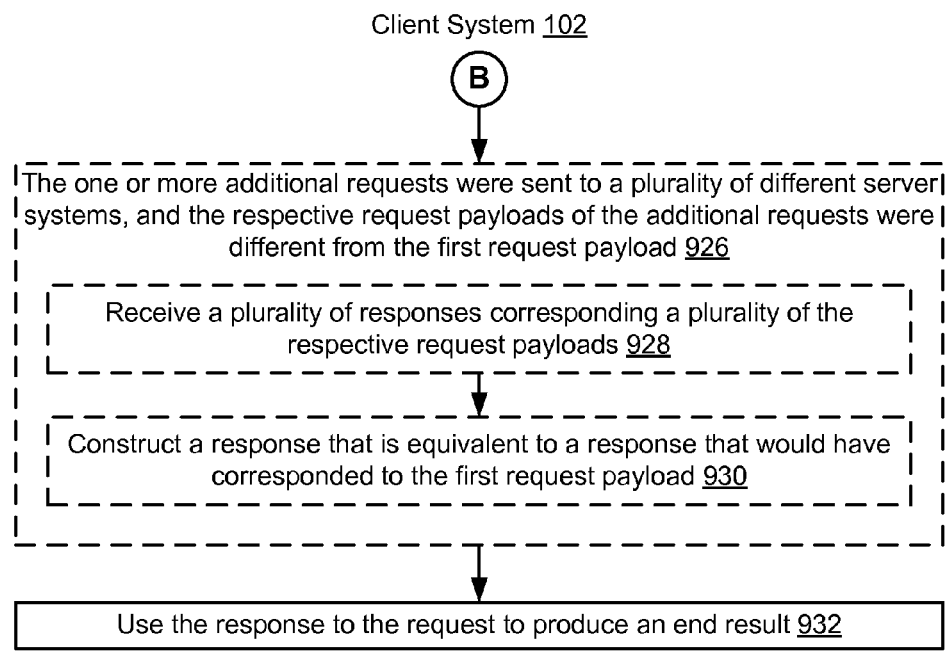

Transmitting Data Requests Including Information Enabling Cancellation of Redundant Data Requests FIGS. 9A-9B include a flow chart illustrating a method 900 for transmitting data requests including information enabling cancellation of redundant data requests, in accordance with some embodiments. Method 900 is, optionally, governed by instructions that are stored in a non-transitory computer readable storage medium and that are executed by one or more processors of one or more computer systems (e.g., Client 102 in FIG. 2). In some implementations, each of the operations shown in FIG. 9A-9B corresponds to instructions stored in a computer memory or non-transitory computer readable storage medium (e.g., memory 206 of Client 102 in FIG. 2 and/or memory). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 900 may be combined and/or the order of some operations may be changed from the order shown in FIGS. 9A-9B.

In some embodiments, Client 102 obtains (902) metadata corresponding to identifiers for first server system and the plurality of other candidate server systems to which the client may send the respective request. In some implementations the other server systems are (904) server systems that individually provide a service that is equivalent to a service provided by the first server system. In other words, in these implementations, Client 102 sends simple requests to these client systems, as described above with reference to FIGS. 5A-5B. In some implementations, the other server systems are (906) server systems that collectively provide a service that is equivalent to a service provided by the first server system. In other words, in these implementations, Client sends a divided request to these client systems whereas Client 102 sent a simple request to the first server system, as described above with reference to FIGS. 5C-5E.

Client 102 generates (908) a respective request. The request includes a request identifier, a plurality of server system identifiers for other server systems to which the client may send the respective request and a first request payload. After generating the respective request, Client 102 sends (910) the respective request to a first server system.

After sending the respective request to the first server system Client 102 determines whether least a predetermined number of responses to request(s) with the request identifier been received. In some implementations, the predefined number is 1 for simple requests, and D for divided requests, where D is the minimum number of divided request responses required to reconstruct the response that would be obtained from successfully processing of the corresponding simple request.

In accordance with a determination that the predetermined number of responses have (912) been received, Client 102 produces an end result using the responses, as described in greater detail below with reference to operations 926-932. In contrast, in accordance with a determination that the predetermined number of responses have not (914) been received, Client 102 determines whether a predefined time period (e.g., a request sending delay) has elapsed. In accordance with a determination that the predefined time period has not (916) elapsed, Client 102 continues to wait. However, in accordance with a determination that a predefined time period has (918) elapsed without receiving at least the predetermined number of responses to the requests (e.g., without receiving a response to the respective request from the first server system) Client 102 sends (920) one or more additional requests to one or more of the other server systems. A respective additional request sent to a respective other server includes the request identifier, a server system identifier for the first server (and, optionally, identifiers for other candidate server systems to which the request may also be or has also been sent) and a respective request payload.

Sending the request to multiple server systems improves the likelihood that the request will produce a response, as a failure to process the request at a single server will not cause all of the requests to fail. Additionally, sending the request to multiple servers improves the speed of processing the request by compensating for the variability of workloads at the candidate server systems. In particular, if the request is only sent to a single server system that has a large backlog of requests, the request will be delayed while the server system works through the backlog of requests. In contrast, by sending the request to multiple server systems, the request will be processed by the first server system to work through its backlog of requests, and consequently the processing time will depend on the time that that the fastest of the candidate server systems takes to process the request rather than the average time that the multiple candidate server systems take to process requests or the time that a randomly selected server system takes to process requests.

In some embodiments, the respective request payload is (922) the same as the first request payload (e.g., so that the respective additional server system can perform the same task). For example, where the requests are simple requests, as described above in greater detail with reference to FIGS. 5A-5B, the request payloads for the requests are the same. In some embodiments, a plurality of additional requests are (924) sent to a plurality of different server systems and the respective request payloads of the additional requests are different from the first request payload and, optionally, are different from each other. For example, in some implementations where the additional requests are divided requests, as described above in greater detail with reference to FIGS. 5C-5E, the request payloads for the divided requests are different from the request payloads for any simple requests that have the same request identifier.

After sending the respective additional request to an additional one of the other server systems, Client 102 repeats the process of determining whether a predetermined number of responses (e.g., at least one response) to the request(s) with the request identifier have been received. Subsequently, when the predetermined number of responses have been received, Client 102 uses the response(s) to the request to produce an end result. In some embodiments, the one or more additional requests were (926) sent to a plurality of different server systems, and the respective request payloads of the additional requests were different from the first request payload (e.g., the request was a divided request, as described in greater detail above with reference to FIGS. 5C-5E). In these embodiments, Client 102 receives (928) a plurality of responses corresponding a plurality of the respective request payloads and constructs (930) a response that is equivalent to a response that would have corresponded to the first request payload (e.g., the response to the simple request). For example, Client 102 uses one or more data file portions and one or more file reconstruction data components to reconstruct a requested data file using Reed-Solomon type encoding or another type of redundant data encoding.

After receiving the response(s) from one or more of the servers to which the requests were sent, Client 102 uses (932) the response(s) to the request (e.g., the response constructed from responses from different server systems or a response from one of the server systems) to produce an end result (e.g., change information displayed to an end user in accordance with the response). For example, if the response includes a requested data item, Client 102 optionally displays data based on the requested data item, or stores the item in a database, or file directory, or the like. As another example, if the response includes a correction for a misspelled word, Client 102 displays the correction instead of or in addition to the misspelled word.

The particular order in which the operations in FIGS. 9A-9B have been described are merely examples and are not intended to indicate that the described order is the only order in which the operations could be performed. One of ordinary skill in the art would recognize various ways to reorder the operations described herein. Additionally, details of other processes described herein with respect to methods 600, 700 and 800 (described herein with respect to FIGS. 6, 7A-7C and 8, respectively) are also applicable in an analogous manner to method 900 described above with respect to FIGS. 9A-9B. For example, the requests, responses, server identifiers, messages and operations described above with reference to method 900 may have one or more of the characteristics of the various requests, responses, server identifiers, messages and operations described herein with reference to methods 600, 700 and 800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing a client-initiated request, performed by a respective server system having one or more processors and memory storing one or more programs that when executed by the one or more processors cause the respective server system to perform the method, the method comprising:
   receiving, from a client system, a respective request including server identifiers for one or more other server systems distinct from the respective server system;
   processing the respective request, wherein processing the request includes generating a response to the request;
   upon completing processing of the respective request, the completed processing including generating the response to the respective request:
      determining whether a predefined number of the other server systems have undertaken responding to the respective request;
      in accordance with a determination that less than the predefined number of the other server systems have undertaken responding to the respective request, sending the response to the client system, and sending a message to one or more of the other server systems indicating that the respective server system has undertaken responding to the respective request; and
      in accordance with a determination that at least the predefined number of the other server systems have undertaken responding to the respective request, forgoing sending a result of the processing to the client system.

2. The method of claim 1, further comprising
   after receiving the respective request, determining whether at least a predefined number of the other server systems have a predefined task-processing status for the respective request; and
   in accordance with a determination, prior to processing the respective request, that at least the predefined number of the other server systems have the predefined task-processing status for the respective request, performing a corresponding task-scheduling action that overrides a default task-scheduling policy as applied to the respective request; and
   in accordance with a determination to perform a respective task-processing operation for the respective request at the respective server system:

sending a processing-status message to one or more of the other server systems indicating that the respective server system has undertaken performance of the respective task-processing operation for the respective request; and performing the respective task-processing operation.

3. The method of claim 2, wherein the respective request is a request selected from the set consisting of: a data retrieval request and an information processing request.

4. The method of claim 2, wherein the respective request includes a respective request identifier that is used to determine whether another server system has undertaken performance of the respective task-processing operation for the respective request.

5. The method of claim 2, wherein the determination as to whether at least the predefined number of the other server systems have a predefined task-processing status for the respective request is based on whether a processing-status message has been received from another server systems indicating that the other server system has undertaken performance of a task-processing operation corresponding to the predefined task-processing status for the respective request.

6. The method of claim 2, wherein the determination as to whether at least the predefined number of other server systems have a predefined task-processing status for the respective request is performed prior to beginning to process the respective request.

7. The method of claim 2, further comprising storing respective states of a plurality of requests, wherein a respective state indicates, for a respective request, whether one or more of the other server systems has undertaken performance of the respective task-processing operation for the respective request.

8. The method of claim 2, further comprising:
storing a queue of requests to be processed at the respective server system, wherein:
the task-scheduling action is a queue-management action related to placing the respective request in the queue or processing the respective request after it has been placed in the queue; and
the task-scheduling policy is a queue-management policy.

9. The method of claim 8, wherein the determination as to whether at least the predefined number of other server systems have a predefined task-processing status for the respective request is performed prior to adding the respective request to the queue.

10. The method of claim 8, wherein the determination as to whether at least the predefined number of other server systems have a predefined task-processing status for the respective request is performed after adding the respective request to the queue.

11. The method of claim 10, further comprising:
in response to receiving the respective request, adding the respective request to the queue, the queue including one or more prior requests; and
after adding the respective request to the queue, processing one or more of the prior requests in the queue of requests;
wherein the determination as to whether at least the predefined number of other server systems have a predefined task-processing status for the respective request is performed when the respective request is a next request in the queue to be processed.

12. The method of claim 8, wherein the queue-management action is an action selected from the set consisting of:
forgoing placing the respective request in the queue;
lowering a respective priority of the respective request in the queue; and
removing the respective request from the queue.

13. The method of claim 2, wherein the determination to perform a respective task-processing operation for the respective request includes a determination to process the request and is based on a determination that:
the respective server system is ready to begin processing the respective request; and
less than the predefined number of the other server systems have begun to process the respective request.

14. The method of claim 2, wherein sending the processing-status message indicating that the respective server system has undertaken performance of the respective task-processing operation for the respective request includes sending the processing-status message to a plurality of the other server systems.

15. The method of claim 1, wherein the determination that at least the predefined number of other server systems have undertaken responding to the respective request comprises a determination that the predefined number of other server systems have responded to the respective request to the client system.

16. A server system, comprising:
one or more processors;
memory; and
one or more programs, wherein the one or more programs are stored in the memory and configured to be executed by the one or more processors, the one or more programs including instructions for:
receiving, from a client system, a respective request including server identifiers for one or more other server systems distinct from the respective server system;
processing the respective request, wherein processing the request includes generating a response to the request;
upon completing processing of the respective request, the completed processing including generating the response to the respective request:
determining whether a predefined number of the other server systems have undertaken responding to the respective request;
in accordance with a determination that less than the predefined number of the other server systems have undertaken responding to the respective request, sending the response to the client system, and sending a message to one or more of the other server systems indicating that the respective server system has undertaken responding to the respective request; and
in accordance with a determination that at least the predefined number of the other server systems have undertaken responding to the respective request, forgoing sending a result of the processing to the client system.

17. The server system of claim 16, wherein the one or more programs, when executed by the one or more processors, cause the server system to:
after receiving the respective request, determine whether at least a predefined number of the other server systems have a predefined task-processing status for the respective request; and in accordance with a determination, prior to processing the respective request, that at least the predefined number of the other server systems have the predefined task-processing status for the respective request, perform a corresponding task-scheduling action that overrides a default task-scheduling policy as applied to the respective request; and in accordance with a determination to perform a respective task-processing operation for the respective request at the respective server system:

send a processing-status message to one or more of the other server systems indicating that the respective server system has undertaken performance of the respective task-processing operation for the respective request; and perform the respective task-processing operation.

18. The server system of claim 16, wherein the respective request is a request selected from the set consisting of: a data retrieval request and an information processing request.

19. The server system of claim 16, wherein the respective request includes a respective request identifier that is used to determine whether another server system has undertaken performance of the respective task-processing operation for the respective request.

20. The server system of claim 16, wherein the determination as to whether at least the predefined number of the other server systems have a predefined task-processing status for the respective request is based on whether a processing-status message has been received from another server systems indicating that the other server system has undertaken performance of a task-processing operation corresponding to the predefined task-processing status for the respective request.

21. The server system of claim 16, wherein the determination as to whether at least the predefined number of other server systems have a predefined task-processing status for the respective request is performed prior to beginning to process the respective request.

22. The server system of claim 16, wherein the one or more programs, when executed by the one or more processors, cause the server system to store respective states of a plurality of requests, wherein a respective state indicates, for a respective request, whether one or more of the other server systems has undertaken performance of the respective task-processing operation for the respective request.

23. A non-transitory computer readable storage medium storing one or more programs, the one or more programs comprising instructions, which when executed by a server system with one or more processors, cause the server system to:

receive, from a client system, a respective request including server identifiers for one or more other server systems distinct from the respective server system;

process the respective request, wherein processing the request includes generating a response to the request;

upon completing processing of the respective request, the completed processing including generating the response to the respective request:

determine whether a predefined number of the other server systems have undertaken responding to the respective request;

in accordance with a determination that less than the predefined number of the other server systems have undertaken responding to the respective request, send the response to the client system, and sending a message to one or more of the other server systems indicating that the respective server system has undertaken responding to the respective request; and in accordance with a determination that at least the predefined number of the other server systems have undertaken responding to the respective request, forgo sending a result of the processing to the client system.

24. The non-transitory computer readable storage medium of claim 23, wherein the one or more programs, when executed by the one or more processors, cause the server system to:

after receiving the respective request, determine whether at least a predefined number of the other server systems have a predefined task-processing status for the respective request; and in accordance with a determination, prior to processing the respective request, that at least the predefined number of the other server systems have the predefined task-processing status for the respective request, perform a corresponding task-scheduling action that overrides a default task-scheduling policy as applied to the respective request; and in accordance with a determination to perform a respective task-processing operation for the respective request at the respective server system:

send a processing-status message to one or more of the other server systems indicating that the respective server system has undertaken performance of the respective task-processing operation for the respective request; and perform the respective task-processing operation.

25. The non-transitory computer readable storage medium of claim 23, wherein the respective request is a request selected from the set consisting of: a data retrieval request and an information processing request.

26. The non-transitory computer readable storage medium of claim 23, wherein the respective request includes a respective request identifier that is used to determine whether another server system has undertaken performance of the respective task-processing operation for the respective request.

27. The non-transitory computer readable storage medium of claim 23, wherein the determination as to whether at least the predefined number of the other server systems have a predefined task-processing status for the respective request is based on whether a processing-status message has been received from another server systems indicating that the other server system has undertaken performance of a task-processing operation corresponding to the predefined task-processing status for the respective request.

28. The non-transitory computer readable storage medium of claim 23, wherein the determination as to whether at least the predefined number of other server systems have a predefined task-processing status for the respective request is performed prior to beginning to process the respective request.

29. The non-transitory computer readable storage medium of claim 23, wherein the one or more programs, when executed by the one or more processors, cause the server system to store respective states of a plurality of requests, wherein a respective state indicates, for a respective request, whether one or more of the other server systems has undertaken performance of the respective task-processing operation for the respective request.

* * * * *